(12) United States Patent
Gupta et al.

(10) Patent No.: US 10,963,555 B2
(45) Date of Patent: *Mar. 30, 2021

(54) ELECTRONIC DEVICE, METHOD FOR AUTHENTICATING USER, AND COMPUTER READABLE RECORDING MEDIUM

(71) Applicant: SAMSUNG ELECTRONICS CO., LTD., Gyeonggi-do (KR)

(72) Inventors: Sandeep Gupta, Noida (IN); Gaurav Kakkar, Noida (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 176 days.

This patent is subject to a terminal disclaimer.

(21) Appl. No.: 16/185,695

(22) Filed: Nov. 9, 2018

(65) Prior Publication Data

US 2019/0095605 A1  Mar. 28, 2019

Related U.S. Application Data

(63) Continuation of application No. 14/624,663, filed on Feb. 18, 2015, now Pat. No. 10,127,372.

(30) Foreign Application Priority Data

Feb. 14, 2014 (IN) .............................. 689/CHE/2014
Jan. 19, 2015 (KR) ......................... 10-2015-0008806

(51) Int. Cl.
*G06F 21/00*  (2013.01)
*G06F 21/36*  (2013.01)

(52) U.S. Cl.
CPC .................................... *G06F 21/36* (2013.01)

(58) Field of Classification Search
CPC .......... G06F 21/36; G06F 21/30; G06F 21/31; H04L 63/0869
(Continued)

(56) References Cited

U.S. PATENT DOCUMENTS

2002/0104005 A1* 8/2002 Yin .......................... G06F 21/36
713/185
2002/0145300 A1 10/2002 Webber
(Continued)

FOREIGN PATENT DOCUMENTS

EP  2528010 A1  11/2012
JP  2013-161150 A  8/2013
(Continued)

OTHER PUBLICATIONS

NPL—Password Input Interface by Mendori et al.—2002 (International Conference on Computer Education—ICCE' 2002).*
(Continued)

*Primary Examiner* — Longbit Chai
(74) *Attorney, Agent, or Firm* — Sughrue Mion, PLLC

(57) ABSTRACT

An electronic device, a method of an electronic device authenticating a user and a computer readable recording medium are provided. The electronic device includes a storage configured to store an identifier and attributes of a first object as authentication information, a display configured to display a plurality of authentication objects comprising a second object that has one or more of the attributes of the first object and has a form different from a form of the first object, in response to a request to perform an authentication procedure, and a controller configured to authenticate a user based on an attribute of an authentication object selected by the user from among the plurality of displayed authentication objects and the stored authentication information.

16 Claims, 28 Drawing Sheets

(58) Field of Classification Search
USPC .......................................................... 726/19
See application file for complete search history.

(56) References Cited

U.S. PATENT DOCUMENTS

| | | |
|---|---|---|
| 2006/0156016 A1 | 7/2006 | Tanaka |
| 2007/0277224 A1 | 11/2007 | Osborn et al. |
| 2009/0199295 A1 | 8/2009 | Shih et al. |
| 2010/0180336 A1 | 7/2010 | Jones et al. |
| 2013/0055169 A1 | 2/2013 | Wright et al. |
| 2013/0094770 A1 | 4/2013 | Lee et al. |
| 2013/0147795 A1 | 6/2013 | Kim et al. |
| 2013/0229367 A1 | 9/2013 | Pinch |

FOREIGN PATENT DOCUMENTS

| | | | |
|---|---|---|---|
| KR | 10-2009-0065766 A | 6/2009 | |
| KR | 10-1228809 B1 | 1/2013 | |
| KR | 10-2013-0037396 A | 4/2013 | |
| KR | 10-2013-0040366 A | 4/2013 | |
| KR | 10-2013-0100495 A | 9/2013 | |
| KR | 10-2014-0001344 A | 1/2014 | |

OTHER PUBLICATIONS

Communication dated Sep. 12, 2017, from the European Patent Office in counterpart European Application No. 15749563.1.
Search Report dated May 14, 2015 by the International Searching Authority in related Application No. PCT/KR2015/001477, (PCT/ISA/210).
Written Opinion dated May 14, 2015 by the International Searching Authority in related Application No. PCT/KR2015/001477, (PCT/ISA/237).
International Conference on Computer Education—ICCE' 2002, Mendori et al.
Communication dated Jun. 25, 2019 issued by the European Intellectual Property Office in counterpart European Application No. 15 749 563.1.
Communication dated Feb. 2, 2021 issued by the Korean Intellectual Property Office in counterpart Korean Application No. 10-2015-0008806.

* cited by examiner (a)

| Red | Green | Blue | Orange | White | Pink | Violet | Indigo | Magenta |

(a)  Red   Green   Yellow   White   Black   Orange (b) 
Cricket  Badminton  Football  Hockey  Golf  Table Tennis (c) 
Squirrel  Elephant  Cat  Dog  Horse  Bear (d) 
Rose  Sunflower  Lotus  Marigold  Tulip  Jasmine (a)

(b)

(c)

(d)

ELECTRONIC DEVICE, METHOD FOR AUTHENTICATING USER, AND COMPUTER READABLE RECORDING MEDIUM

CROSS-REFERENCE TO RELATED APPLICATIONS

This application is a Continuation Application of U.S. application Ser. No. 14/624,663, filed Feb. 18, 2015, which claims the benefit claims priority from Korean Patent Application No. 10-2015-0008806, filed on Jan. 19, 2015 in the Korean Intellectual Property Office, and Indian Patent Application No. 689/CHE/2014, filed on Feb. 14, 2014 in the Indian Patent Office, the disclosures of which are incorporated herein by reference in their entireties.

BACKGROUND

1. Field

Apparatuses and methods consistent with exemplary embodiments relate to an electronic device, a method for authentication a user, and a computer readable recording medium, and more particularly, to an electronic device such as a smart phone which is configured to display an authentication window with dynamically changing objects to unlock a screen lock of the electronic device, and a method for authenticating a user and a computer readable recording medium.

2. Description of the Related Art

Present day electronic devices, for example, smart phones, personal computers, tablet computers, smart televisions, and smart music systems have security features. Some examples of security features include screen locks, PIN codes, and passwords. However, these security features are not often strong enough in protecting user' privacy.

For example, the screen lock is vulnerable to a situation where an unauthorized person in the vicinity of a user of an electronic device sees the user enter his/her screen lock security pattern. In that case, the unauthorized person may be able to access and extract any kind of information found on the electronic device.

In light of the foregoing discussion, there is a need for a user configurable screen lock with a dynamically generated authentication window to prevent unauthorized users from accessing the electronic device.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide an electronic device configured to display an authentication window with dynamically changing objects to unlock a screen lock of the electronic device, and a method for authenticating a user and a computer readable recording medium.

According to an aspect of an exemplary embodiment, there is provided a method of an electronic device authenticating a user. The method includes: storing an identifier and attributes of a first object as authentication information; in response to a request to perform an authentication procedure, displaying a plurality of authentication objects comprising a second object that has one or more of the attributes of the first object and has a form different from a form of the first object; and authenticating a user based on an attribute of an authentication object selected by the user from among the plurality of displayed authentication objects and the stored authentication information.

The first object may be of a plurality of first objects, and the storing the authentication information may include storing a sequence of connecting the plurality of first objects, as the authentication information.

The first object and the second object may include at least one from among a corresponding text and a corresponding image.

The attributes of the first object may include one or more from among a layout shape, a number, a theme, a color, and an inner design pattern of the first object.

The storing the authentication information may include storing token information which is generated using a first character of a text form of the identifier of the first object as the authentication information.

The method may further include displaying at least one dummy object which does not have the attributes of the first object, in response to the request to perform the authentication procedure.

The displaying the at least one dummy object may include displaying the at least one dummy object based on a type and a number of the at least one dummy object.

The method may further include displaying a hint related with the authentication information in response to the authentication of the user failing.

The storing the authentication information may include storing one or more selected by the user among an arrangement shape, a number and attributes of a plurality of objects displayed on a screen as the authentication information, and wherein the plurality of objects comprise the first object.

The plurality of authentication objects are changeable based on a security level of the electronic device.

According to another aspect of an exemplary embodiment, there is provided an electronic device including: a storage configured to store an identifier and attributes of a first object as authentication information; a display configured to display a plurality of authentication objects comprising a second object that has one or more of the attributes of the first object and has a form different from a form of the first object, in response to a request to perform an authentication procedure; and a controller configured to authenticate a user based on an attribute of an authentication object selected by the user from among the plurality of displayed authentication objects and the stored authentication information.

The first object is of a plurality of first objects, and the storage further configured to store a sequence of connecting the plurality of first objects, as the authentication information.

The first object and the second object may include at least one from among a corresponding text and a corresponding image.

The attributes of the first object may include one or more from among a layout shape, a number, a theme, a color, and an inner design pattern of the first object.

The storage may be further configured to store token information which is generated using a first character of a text form of the identifier of the first object as the authentication information.

The controller may be further configured to control the display to display at least one dummy object which does not have the attributes of the first object, in response to the request to perform the authentication procedure.

The controller may be further configured to display the dummy objects based on a type and a number of the at least one dummy object.

The controller may be further configured to control the display to display a hint related with the authentication information in response to the authentication of the user failing.

The storage may be further configured to store one or more selected by the user among an arrangement shape, a number and attributes of a plurality of objects displayed on a screen as the authentication information, and wherein the plurality of objects comprise the first object.

The plurality of authentication objects may be changeable based on a security level of the electronic device.

According to another aspect of an exemplary embodiment, there is provided a non-transitory computer readable recording medium storing a program that is executable by a computer to perform a method of an electronic device authenticating a user. The method may include: generating an identifier and attributes of a first object as authentication information; in response to a request to perform an authentication procedure, displaying a plurality of authentication objects comprising a second object that has one or more of the attributes of the first object and has a form different from a form of the first object; and authenticating a user based on an attribute of an authentication object selected by the user from among the plurality of displayed authentication objects and the generated authentication information.

The first object is of a plurality of first objects, and the generating the authentication information may include generating a sequence of connecting the plurality of first objects, as the authentication information.

The method may further include generating token information based on a first character of a text form of the identifier of the first object as the authentication information.

The method may further include displaying at least one dummy object which does not have the attributes of the first object, in response to the request to perform the authentication procedure.

The method may further include displaying a hint related with the authentication information.

According to another aspect of an exemplary embodiment, there is provide a method of an electronic device authenticating a user. The method includes: storing an identifier and attributes of a first graphical object as authentication information through a first user interface screen; displaying a plurality of authentication objects on a second user interface screen, the plurality of authentication objects comprising a dummy graphical object and a second object, and the second object having at least one of the attributes of the first object and an appearance different from the first object; and authenticating a user in response to recognizing an input pattern that selects the second graphical object and excludes the dummy graphical object.

The displaying the plurality of authentication objects may include displaying the second graphical object in an arrangement different from an arrangement in which the first graphical object is displayed on the first user interface screen.

The appearance of the second graphical object may represent a shape of the second graphical object, a filling type of the shape of the second object, and an identifying description of the second graphical object.

The shape of the second graphical object may correspond to a rectangular shape, a circular shape, a quadrilateral shape, a triangle shape, a square shape, an ellipse shape, or a star shape.

The filling type of the shape of the second graphical object may correspond to a vertical stripes fill, a horizontal stripes fill, a dotted fill, a check-patterned fill, or a solid fill.

The identifying description of the second graphical object may correspond to an image of the second graphical object, a name of a color of the second graphical object, a category of the second graphical object, an initial of the name of the color, or an initial of the category.

BRIEF DESCRIPTION OF THE DRAWINGS

The above and/or other aspects will be more apparent by describing certain exemplary embodiments, with reference to the accompanying drawings, in which:

FIG. 13 is exemplary illustration of object IDs;

DETAILED DESCRIPTION OF EXEMPLARY EMBODIMENTS

Figure 1:
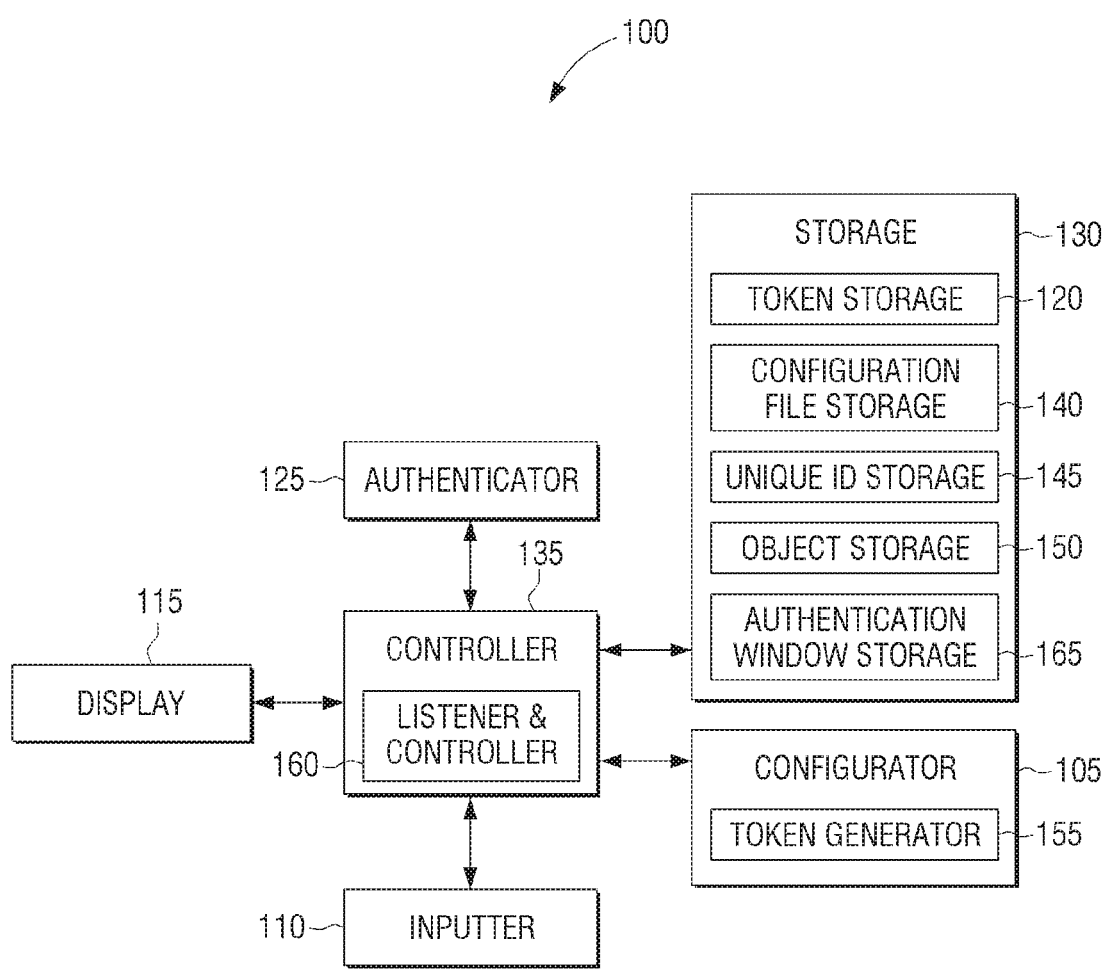
FIG. 1 is a detailed block diagram of an electronic device in accordance with one exemplary embodiment.

Exemplary embodiments are described in greater detail below with reference to the accompanying drawings.

In the following description, same drawing reference numerals are used for the like elements even in different drawings. The matters defined in the description, such as detailed construction and elements, are provided to assist in a comprehensive understanding of the exemplary embodiments. Accordingly, it is apparent that the exemplary embodiments can be carried out without those specifically defined matters. Also, well-known functions or constructions are not described in detail since they would obscure the description with unnecessary detail.

One or more exemplary embodiments provide a lock-screen with dynamically generated authentication windows for an electronic device and allow a user to configure one or more authentication windows. Further, one or more exemplary embodiments permit the user to select an authentication window among the plurality of authentication windows to unlock the lock-screen. Still further, one or more exemplary embodiments enable the user to modify the authentication window with random dummy objects before entering a password to unlock the lock-screen. Still further, one or more exemplary embodiments permit the user to generate a self-creation authentication window to unlock the lock-screen. The self-creation authentication is also referred to as real-time authentication window.

FIG. 1 is a block diagram of an electronic device in accordance with one embodiment.

FIG. 1 shows an electronic device 100 which partly or entirely includes a configurator 105, an inputter 110, a display 115, an authenticator 125, a storage 130 and a controller 135. The inputter 110 and the display 115 may form a user interface.

By stating that the embodiment "partly or entirely includes" components, it means that part of the components such as inputter 110 may be omitted, or part of the components such as the authenticator 125 may be integrally incorporated with another component such as the controller 135, although it is assumed herein that all of the components are included for the sake of sufficient understanding.

Before explaining embodiments in detail, it is noted that respective elements may refer to software or hardware configurations, or a combination or part thereof. Accordingly, for example, the configurator 105 may be implemented as a configuration module, and the inputter 110 may be implemented as an input module, although these are simply referred to herein as the "configurator" and the "inputter" for the sake of convenience of explanation.

The electronic device 100 permits the user to configure a plurality of authentication windows. Each authentication window is associated with at least one token and at least one user-defined password. Tokens are generated from user-defined passwords. The user-defined passwords are generated by connecting a first set of objects in the authentication window. The objects are stored in the electronic device in an object storage 150. Further, the user can download the objects from a website. Examples of websites include, but not limited to, a social networking website, an image hosting website and a search engine website. In addition, data items stored in the electronic device may be used as the objects. Examples of data items in the electronic device include, but not limited to, text, images, videos, computer generated three dimensional models and sounds stored in database of the electronic device.

Each object in the first set of objects is associated with a unique identifier (ID) based on an attribute of the object. Examples of attributes include, but not limited to, shape, color, association with sports and association with celebrities. Examples of data related to attributes include but not limited to, "red", "square", "Tom", and "Harry". Each of the objects are assigned multiple attributes by the user. For example, a red circle is associated with the attributes "red color" and "circular shape". It is noted that an attribute is shared by multiple objects. For example, a red circle, an image of a red car, and a red triangle share the attribute "red color". Each of the objects is editable by adding an additional attribute to the object and/or removing some of the attributes from the objects. Moreover, the attributes describe the objects. The objects with similar content share common attributes. For example, an image of a dog, a word "dog" and an image of a puppy share the common attribute "dog". A first object can be represented by a second object if the first object and the second object share common attributes. For example, an image of a red flag can be represented by an image of a red gown. The image of the red flag and the image of the red gown share an attribute "red". In another example, an image of a cat is represented by a word "cat". The image of the cat and the word "cat" share an attribute "cat".

The electronic device 100 enables the configurator 105 to configure a plurality of authentication windows. The configurator 105 configures one or more authentication windows. Each of the authentication windows is associated with at least one token. Configuration of the authentication windows includes generating tokens for each authentication window. The authentication windows are stored in an authentication window storage 165 of the storage 130.

To configure an authentication window, the configurator 105 provides the user with a set of options representing a plurality of classes of objects via the display 115. Examples of classes of objects include, but not limited to, cricket, movies, and flowers. Examples of the display 115 include, but not limited to, liquid crystal display screens, light emitting diode display, cathode ray tube displays and plasma displays. The configurator 105 enables the user to select the class of objects via the inputter 110. The inputter 110 is also referred to as user interface. Examples of the inputter 110 include, but not limited to, touchscreen, microphone, keypad, and camera. The user selects the class of objects by providing inputs via the inputter 110. Examples of methods to provide input in the inputter 110 include providing haptic inputs to a touchscreen, providing voice commands to a microphone, inputting data in a keypad and changing eye gaze in front of a camera.

The configurator 105 creates a layout of objects for the authentication window. The layout of objects contains a plurality of objects belonging to the class of objects selected by the user. In one embodiment, the class of objects and the plurality of objects are stored in the object storage 150. In one embodiment, the layout of objects includes the plurality of objects arranged in a grid. The configurator 105 displays the created layout of objects to the user via the display 115. Objects in the layout are arranged in at least one of a rectangular arrangement, a circular arrangement, a three dimensional arrangement, and a two dimensional arrangement. The shape of layout includes at least one of a rectangular shape, a circular shape and a quadrilateral shape.

In one embodiment, the user is allowed to create the objects in the layout of objects rather than using the objects already stored in the electronic device. For example, the objects in the layout may be created by recognizing a shape of hand-drawn objects. The hand-drawn objects may refer to any handwritten character, non-character shape, or drawing. The user may draw objects, diagrams, and flowcharts freely without restrictions. As a result, the configurator 105 provides full user intervention in configuring the authentication window. Objects in the layout created by the user include objects received in the electronic device from a website. Examples of the website include but not limited to, a social networking website, a search engine website, and an image hosting website. In another embodiment, the layout includes objects generated from data items stored in the electronic device. Examples of data items in the electronic device include, but not limited to, text, images, videos, computer generated three dimensional models and sounds.

Further, the user configures a user-defined password for the authentication window. The user is allowed to select a second set of objects from the layout of objects in a user-defined sequence. The user may select the second set of objects via the inputter 110.

Data regarding selection of the second set of objects in the user-defined sequence are transferred by the inputter 110 to the controller 135. The controller 135 includes a listener and controller 160. The listener and controller 160 captures data regarding selection of the second set of objects in the user-defined sequence and converts the data into event data. The event data includes actions of the user in the inputter 110. Examples of the actions of the user in the inputter 110 includes, but not limited to, a single-touch input, a multi-touch input, swipe, and scroll. The listener and controller 160 identifies a unique ID of the second set of objects selected from the event data. The identified unique ID is stored in a unique ID storage 145. The identified unique ID is transferred to the configurator 105.

The configurator 105 includes a token generator 155. The token generator 155 generates a token from unique IDs associated with the second set of objects. The token represents the plurality of objects selected in the user-defined sequence. The generated token is transferred to the storage 130 and stored in a token storage 120. In one embodiment, each authentication window is configured with multiple tokens. Multiple tokens are configured by providing a plurality of user-defined passwords. The token storage 120 stores a plurality of tokens associated with the authentication windows.

Further, the controller 135 generates a configuration file containing configuration information of the authentication window. The configuration information includes selected objects and corresponding event data and token. Further, the configuration file includes information regarding essential elements associated with the authentication window. The essential elements are defined as attributes representing the layout created to configure the authentication window. Examples of the essential elements include, but not limited to, shape of the layout, the number of objects in the layout, arrangement of objects in the layout and a common theme of objects in the layout. The common theme is an attribute shared commonly by the objects in the layout. Consider an example wherein an authentication window has a "rectangular" shape with "cricket" as a theme and "bat" and "ball" as objects. It is to be noted that, the shape "rectangular", the theme "cricket" and the objects "bat" and "ball" are the essential elements.

The configuration file can be transferred into the storage 130. The storage 130 includes a configuration file storage 140. The configuration file is stored in the configuration file storage 140. The configuration file is transferred from a first electronic device to a second electronic device to implement the authentication window in the second electronic device.

Further, the electronic device 100 authenticates the user with a lock-screen on accessing the electronic device. When the user tries to access the electronic device, the controller 135 displays a plurality of user selectable options via the display 115. The plurality of user selectable options include a first set of user selectable options representing the plurality of authentication windows and an option for self-creating authentication windows. It is to be noted that the self-creating authentication window is also referred to as real-time authentication window. The plurality of authentication windows is stored in the authentication window storage 165. The user may be able to select one of the plurality of user selectable options via the inputter 110. The user may select the user selectable option by entering a first input via the inputter 110.

In one embodiment, the user may select the user selectable option from the first set of user selectable options to select an authentication window.

In another embodiment, the authentication window is selected by the electronic device based on profile of the electronic device. Examples of profile include, but not limited to, a general mode, a silent mode, a meeting mode, and an outdoor mode. For example, a first authentication window is selected by the electronic device if the profile indicates that the electronic device is in the general mode and a second authentication window is selected by the electronic device if the profile indicates that the electronic device is in the silent mode.

The electronic device 100 provides the user options to modify the selected authentication window. The user can modify the authentication window by inserting dummy objects thereby generating a dynamically generated authentication window. The dummy objects include objects downloaded by the user into the object storage 150. In addition, the dummy objects include objects generated from data items stored in the electronic device. Examples of data items in the electronic device include, but not limited to, text, images, videos, computer generated three dimensional models and sounds stored in the electronic device. The electronic device 100 allows the user to enter a second input to set a number and a type of dummy objects to be inserted in the authentication window. In one embodiment, the user enters the second input to set number and type of dummy objects to be inserted in the authentication window. In another embodiment, the user enters the second input to select dummy objects. In yet another embodiment, the second input is assigned by the electronic device 100 by default. It is to be noted that the dummy objects do not form part of the user-defined password. However, dummy objects are inserted in the authentication window to confuse unauthorized users in the vicinity of the electronic device. Inserting dummy objects increases the complexity of the dynamically generated authentication window.

The controller 135 generates the dynamically generated authentication window based on the first input and the second input. Tokens and user-defined passwords associated with the authentication window is associated with the dynamically generated authentication window. Further, the dynamically generated authentication window includes a plurality of objects arranged randomly. The plurality of objects include the second set of objects and a plurality of dummy objects. It is noted that an object in the second set of objects can be represented by a different object in the dynamically generated authentication window. A first object in the second set of objects is represented by a second object if the first object and the second object share common attributes. In an exemplary illustration, an image of a red flag in the second set of objects is represented by an image of a red gown in the dynamically generated authentication window. The image of the red flag and the image of the red gown share an attribute "red". In another exemplary illustration, an image of a dog in the second set of objects is represented by a word "Dog" in the dynamically generated authentication window. The image of the dog and the word "Dog" share an attribute "dog". As a result, complexity of the dynamically generated authentication window is increased.

In one embodiment, the dynamically generated authentication window displays hints for the user-defined password associated with the authentication window. In another embodiment, objects in the dynamically generated authentication window interact with the user to provide hints for the user-defined password associated with the authentication window. Hints assist the user in recollecting the user-defined password associated with the authentication window. Examples of hints include, but not limited to, textual data, images, patterns, sounds, videos, and interactive computer simulations. In one embodiment, hints include words describing objects to be selected in a pattern to unlock the authentication window. In another embodiment, hints include images sharing common attributes with the objects. In yet another embodiment, hints include verbal instructions to assist the user to recollect the user-defined password associated with the authentication window.

Next, the controller 135 enables display of the dynamically generated authentication window on a lock-screen. The user can access the electronic device by providing a third input on the dynamically generated authentication window. The third input is hereinafter referred to as authentication password. The user provides the third input by selecting a third set of objects among the plurality of objects in a user-defined sequence. The user selects the third set of objects via the inputter 110. Data regarding selection of the third set of objects and the user-defined sequence are transferred by the inputter 110 to the controller 135. Any change or update in the authentication window is communicated to other elements by the listener and controller 160. The listener and controller 160 captures data regarding selection of the third set of objects and the user-defined sequence and converts the data into event data. The listener and controller 160 generates a reference code from the event data. The event data includes actions of the user in the inputter 110. Examples of the actions of the user in the inputter 110 includes, but not limited to, a single-touch input, a multi-touch input, swipe, scroll and key-press. The listener and controller 160 may detect user inputs and provide information of basic shapes, objects, and count. In addition, the listener and controller 160 updates the authentication window when the user provides inputs regarding user preferences.

Further, the listener and controller 160 may transfer the reference code to the authenticator 125. The authenticator 125 authenticates the user by comparing the reference code with a token of the authentication window. If the reference code matches the token, then the authentication password is valid. If the authentication password is valid, the lock-screen is unlocked. If the authentication password is invalid, access is denied to the user.

In one embodiment, while unlocking, the user can select an option to generate a self-creation authentication window. With self-creation feature, the electronic device 100 allows the user to configure a self-creation authentication window. The self-creation authentication window is also referred to as real-time authentication window since the authentication window is created in real-time. To generate the self-creation authentication window, the electronic device 100 may create a layout of objects first through a user input. The objects may be selected from pre-existing objects that are stored in the electronic device, or from a website, or from data items stored in the electronic device. The website can be a social networking website, a search engine website, or an image hosting website. Examples of data items in the electronic device include, but not limited to, text, images, videos, computer generated three dimensional models and sounds.

Upon creation of the self-creation authentication window, the electronic device 100 may perform an operation of comparison. The self-creation authentication window is compared with an existing authentication window stored in the authentication window storage 165. The electronic device 100 may compare the authentication windows based on any one of the attributes or essential elements like shape, arrangement, or theme of the objects. The electronic device 100 may also compare the authentication windows based on layout of objects.

Further, if there is a match between the authentication windows, the electronic device 100 may enter a stage that allows the user to enter a password. Then the electronic device 100 may compare the passwords of the authentication windows. If there is a match between the passwords of the authentication windows, then the electronic device is unlocked.

In one embodiment, the step of comparison of the authentication windows as well as the step of comparison of the passwords of the authentication windows is performed in parallel and the result of the comparison is displayed to the user. The user is allowed to take a corrective step in case any one of the comparisons do not give a desired match.

Figure 2:
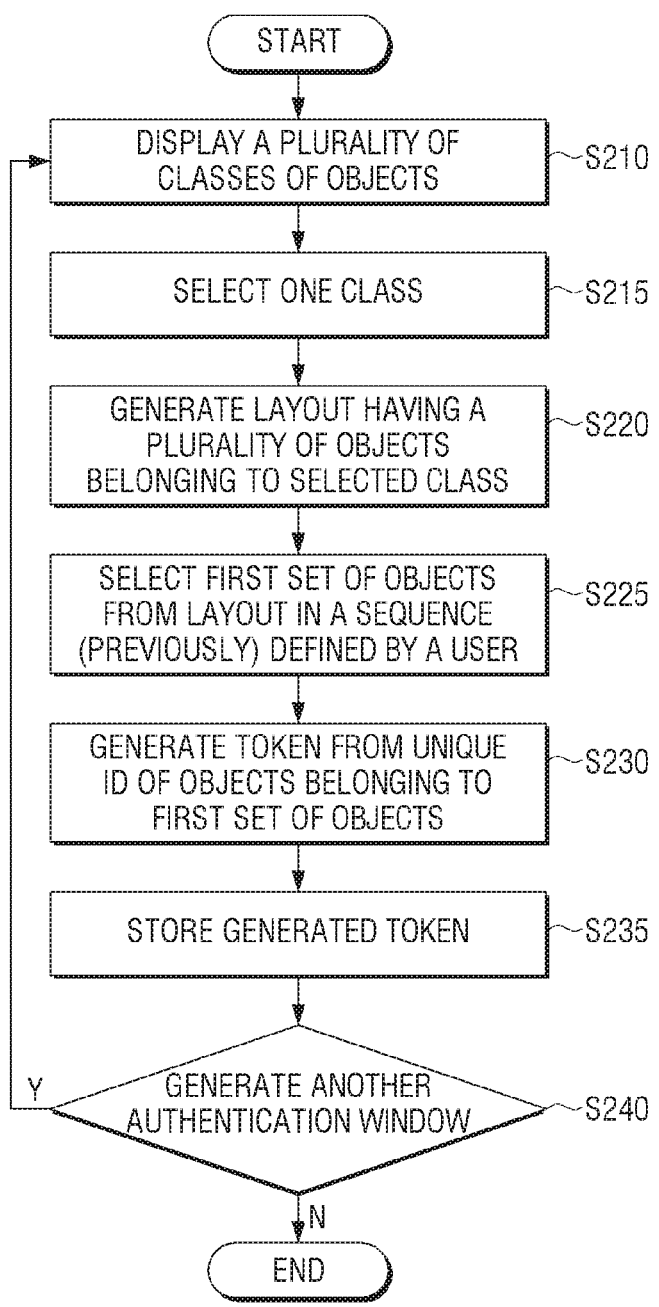
FIG. 2 is a flowchart illustrating process of configuring a plurality of authentication windows, in accordance with one exemplary embodiment.

FIG. 2 is a flowchart illustrating steps of configuration of a plurality of authentication windows, in accordance with one exemplary embodiment. The flowchart begins at step 205.

At step 210, a configurator 105 enables a display 115 to display a plurality of classes of objects. The configurator 105 enables the user to select a class of objects from the plurality of classes of objects through an inputter 110. Examples of classes of objects include, but not limited to, cricket, movies, and flowers.

At step 215, a class of objects for configuring the authentication window may be selected through the inputter 110.

At step 220, the configurator 105 creates a layout of objects by selecting a plurality of objects belonging to the selected class. Further, the configurator 105 displays the created layout of objects on the display 115. In the layout, the plurality of objects can be arranged in a specific order. Examples of the arrangement include but not limited to, a circular arrangement, a rectangular arrangement, a two dimensional arrangement and a three dimensional arrangement.

In one embodiment, the user is allowed to create objects in the layout of objects. As a result, the configurator provides full user intervention in configuring the authentication window. The objects in the layout created by the user includes objects received in the electronic device from a website. Examples of the website include but not limited to, a social networking website, a search engine website, and an image hosting website. In another embodiment, the objects created by the user include objects generated from data items stored in the electronic device. Examples of data items in the electronic device include, but not limited to, text, images, videos, computer generated three dimensional models and sounds.

At step 225, the first set of objects may be selected in a user-defined sequence via the inputter 110. Data regarding selection of the first set of objects and the user-defined sequence are transferred to a controller 135. The controller 135 includes a listener and controller 160. The listener of the listener and controller 160 captures data regarding selection of the first set of objects and the user-defined sequence and converts the data into event data. The event data includes actions of the user received through the inputter 110. Examples of the actions of the user in the inputter 110 include, but not limited to, a single-touch input, a multi-touch input, swipe, and scroll. The controller 135 identifies a unique ID of the objects from the event data. The unique ID is transferred to the configurator 105.

At step 230, a token generator 155 in the configurator 105 generates a token from unique IDs associated with the first set of objects. The token represents the plurality of objects selected in the user-defined sequence. It is noted that an order of occurrence of steps 210, 215, 220, 225, and 230 is not restricted to the order described in the present disclosure. For example, step 220 can be performed before step 210.

At step 235, the generated token is stored in a token storage 120. The token storage 120 is in the storage 130 of the electronic device 100.

At step 240, the configurator 105 provides the user with an option for creating another authentication window. If the user wants to configure another authentication window, step 210 is performed. If the user decides to stop configuring authentication windows, step 245 is performed.

The flowchart ends at step 245.

Figure 3:
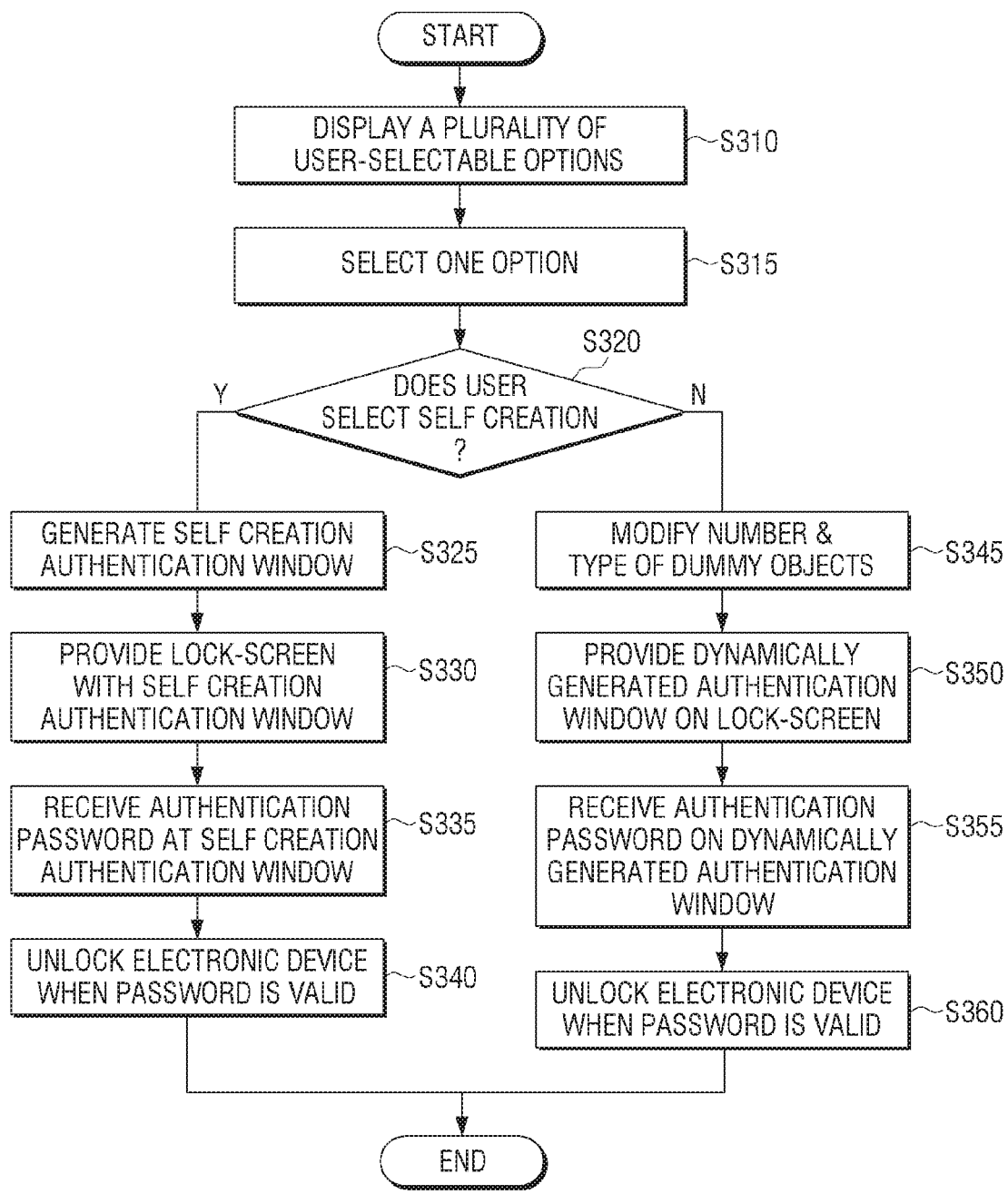
FIG. 3 is a flowchart illustrating process of unlocking a lock-screen in accordance with one exemplary embodiment.

FIG. 3 is a flowchart illustrating process of unlock a lock-screen, in accordance with one exemplary embodiment. The flowchart begins at step 305.

At step 310, a controller 135 displays a plurality of user selectable options via a display 115. The plurality of user selectable options include a first set of user selectable options representing a plurality of authentication windows and an option self-creation feature.

At step 315, one of the plurality of user selectable options may be selected by inputting a first input through an inputter 110.

At step 320, the controller 135 checks if the user has opted for self-creation by selecting the option for self-creation feature. If the user selects the option for the self-creation feature, step 325 is performed. If the user selects the user selectable option from the first set of user selectable options, step 345 is performed. The user may select the first set of user selectable options to select an authentication window from the plurality of authentication windows.

At step 325, with self-creation feature, the controller 135 generates a self-creation authentication window. To generate the self-creation authentication window, the controller 135 may create a layout of objects. For example, the user may create the layout by at least one of selecting the objects already stored in the electronic device, selecting objects received in the electronic device from a website and selecting objects generated from data items stored in the electronic device. The controller 135 generates the self-creation authentication window by arranging the plurality of selected objects. Further, the controller 135 compares the self-creation authentication window with one or more authentication windows stored in an authentication window storage of the electronic device 100. The controller compares essential elements of the self-creation authentication window with essential elements of the authentication windows stored in the electronic device. If the self-authentication window matches with at least one of authentication windows stored in the electronic device, step 330 is performed. If the self-creation authentication window fails to match with at least one authentication window stored in the electronic device, access is denied to the user.

At step 330, the controller 135 presents the self-creation authentication window on the lock-screen.

At step 335, the user enters an authentication password in the self-creation authentication window. The controller 135 receives the authentication password.

At step 340, the electronic device 100 is unlocked if the authentication password is valid. An authenticator authenticates the user by comparing the reference code with tokens associated with each authentication window. If the reference code matches a token associated with one of the authentication windows, then the authentication password is valid. If the authentication password is valid, the lock-screen is unlocked. If the authentication password is invalid, access is denied to the user.

At step 345, the controller 135 provides options to modify the authentication window if the user selects the first set of user selectable options at step 320. The user modifies the authentication window by inserting dummy objects. In one embodiment, the user can set a number and a type of dummy objects to be inserted in the authentication window. In another embodiment, the user is allowed to select dummy objects. In yet another embodiment, the authentication window is modified by applying a default configuration, wherein the default configuration comprises a predetermined type of dummy objects and a predetermined number of dummy objects. The dummy objects are inserted in the authentication window to confuse unauthorized users in the vicinity of the electronic device. The user can select the number and type of the dummy objects by entering a second input to the inputter. The controller 135 generates a dynamically generated authentication window based on the first input and the second input. The electronic device 100 performs step 350 after step 345.

At step 350, the controller 135 controls the display 115 to display the dynamically generated authentication window on the lock-screen.

At step 355, the user may enter an authentication password through the dynamically generated authentication window. The controller 135 receives the authentication password.

At step 360, the electronic device 100 is unlocked if the authentication password is valid. The controller 135 generates a reference code from the authentication password. Further, the controller 135 accesses a token associated with the dynamically generated authentication window. The token is accessed from a token storage. The controller 135 compares the reference code with the token. If the reference code matches with the token, the authentication password is valid. If the authentication password is valid, the user is authenticated and the electronic device is unlocked. If the authentication password is invalid, access is denied to the user.

The flowchart ends at step 365.

Figure 4:
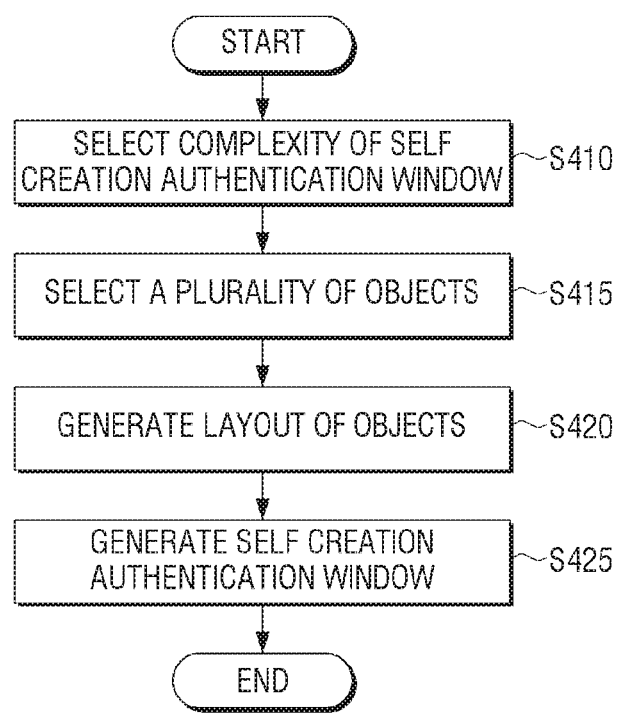
FIG. 4 is a flowchart illustrating process of generating a self-creation authentication window, in accordance with one exemplary embodiment.

FIG. 4 is a flowchart illustrating process of generate a self-creation authentication window, in accordance with one exemplary embodiment. The flowchart begins at step 405.

At step 410, an electronic device 100 receives a first input from a user. The user may select complexity of the self-creation authentication window by providing the first input. In one embodiment, the complexity of the self-creation authentication window is associated with the number of objects in the self-creation authentication window. Hence, the first input is the number of objects in the self-creation authentication window. In another embodiment, the complexity of the self-creation authentication window indicates a type of objects in the self-creation authentication window. Hence, the first input decides the type of the objects in the self-creation authentication window.

At step 415, a plurality of objects are selected to configure the self-creation authentication window. In one embodiment, the user may select the plurality of objects from those already stored in the electronic device. In another embodiment, the user may select the objects from a website. Examples of the website include but not limited to, a social networking website, a search engine website, and an image hosting website. In another embodiment, the user may select objects generated from data items stored in the electronic device. Examples of data items in the electronic device include, but not limited to, text, images, videos, computer generated three dimensional models and sounds.

At step 420, a layout of objects is created with the plurality of objects which have been selected to configure the self-creation authentication window.

At step 425, the electronic device 100 generates the self-creation authentication window by arranging the plurality of objects. It is noted that an order of occurrence of steps 410, 415, and 420 is not restricted to the order described in the present disclosure. For example, step 420 can be performed before step 410.

The flowchart ends at step 430.

Figure 5:
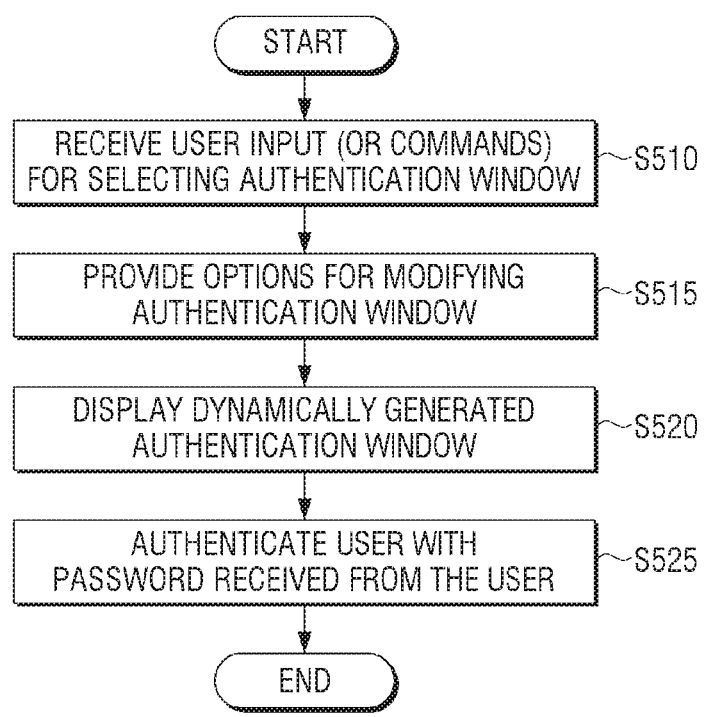
FIG. 5 is a flowchart illustrating a method of authenticating a user, in accordance with one exemplary embodiment.

FIG. 5 is a flowchart illustrating a method of authenticating a user, in accordance with one embodiment. The flowchart starts at step 505.

At step 510, a lock-screen receives an input from the user. A plurality of user selectable options are presented to the user on the lock screen. The plurality of user selectable options represents a plurality of authentication windows. One of the authentication windows may be selected via a user interface. For example, the user may select an authentication window by entering the input. The input received from the user indicates the authentication window to be displayed on the lock-screen.

At step 515, the lock-screen provides the user with an option to modify the authentication window with random dummy objects. In one embodiment, the user is allowed to set a number and a type of dummy objects to be inserted in the authentication window. In another embodiment, the user is allowed to select dummy objects. In yet another embodiment, a pre-set type and a pre-set number of dummy objects is assigned by default. The dummy objects are inserted into the authentication window to confuse unauthorized users in the vicinity of the electronic device.

At step 520, the lock-screen displays a dynamically generated authentication window. The dynamically generated authentication window is the modified authentication window. An authentication password may be entered through the dynamically generated authentication window.

At step 525, the lock-screen authenticates the user by validating the authentication password entered by the user. The lock-screen generates a reference code from the authentication password. The reference code is compared with a token associated with the authentication window to check the validity. If the reference code matches with the token, the authentication password is valid. If the authentication password is valid, the user is authenticated.

The flowchart ends at step 530.

Figure 6:
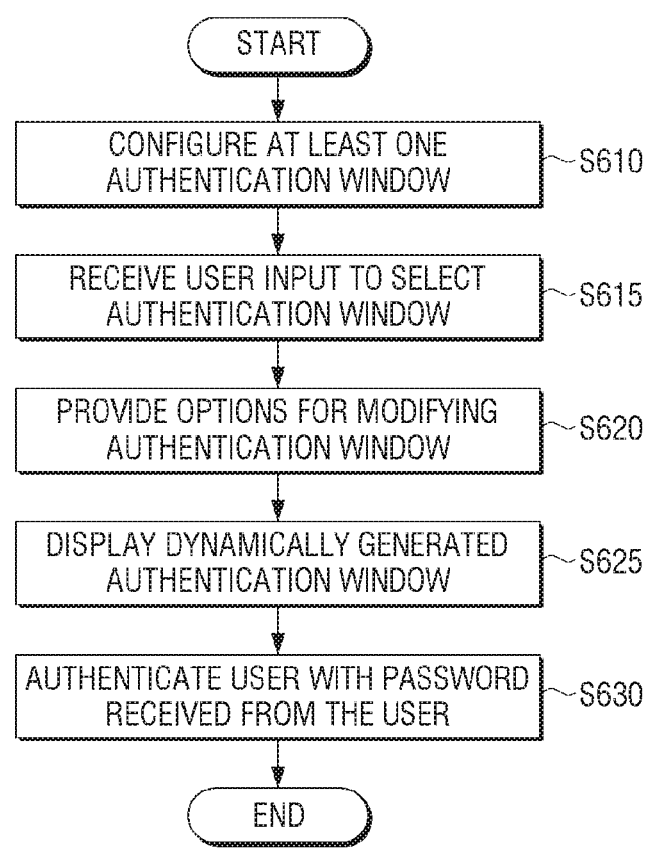
FIG. 6 is a flowchart illustrating a method of authenticating a user, in accordance with another exemplary embodiment.

FIG. 6 is a flowchart illustrating a method of authenticating a user, in accordance with another exemplary embodiment. The flowchart starts at step 605.

At step 610, a configurator 105 configures one or more authentication windows based on a user input.

Steps 615, 620, 625, and 630 are the steps involved in authenticating the user and thereby unlocking a lock-screen.

At step 615, a lock-screen receives an input from the user. A plurality of user selectable options are presented to the user on the lock screen. The plurality of user selectable options represent a plurality of authentication windows. The user is allowed to select one of the plurality of authentication windows via a user interface. The user may select an authentication window by entering the input. The input received from the user indicates the authentication window to be displayed on the lock-screen.

At step 620, the lock-screen provides the user with an option to modify the authentication window with random dummy objects. In one embodiment, the user is allowed to set a number and a type of dummy objects to be inserted in the authentication window. In another embodiment, the user is allowed to select dummy objects. In yet another embodiment, a pre-set type and a pre-set number of dummy objects are assigned by default. The dummy objects are inserted into the authentication window to confuse unauthorized users in the vicinity of the electronic device.

At step 625, the lock-screen displays a dynamically generated authentication window. The dynamically generated authentication window is the modified authentication window. An authentication password may be entered through the dynamically generated authentication window.

At step 630, the lock-screen authenticates the user by validating the authentication password entered by the user. The lock-screen generates a reference code from the authentication password. The reference code is compared with a token associated with the authentication window to check the validity. If the reference code matches with the token, the authentication password is valid. If the authentication password is valid, the user is authenticated.

The flowchart ends at step 635.

Figure 7A:
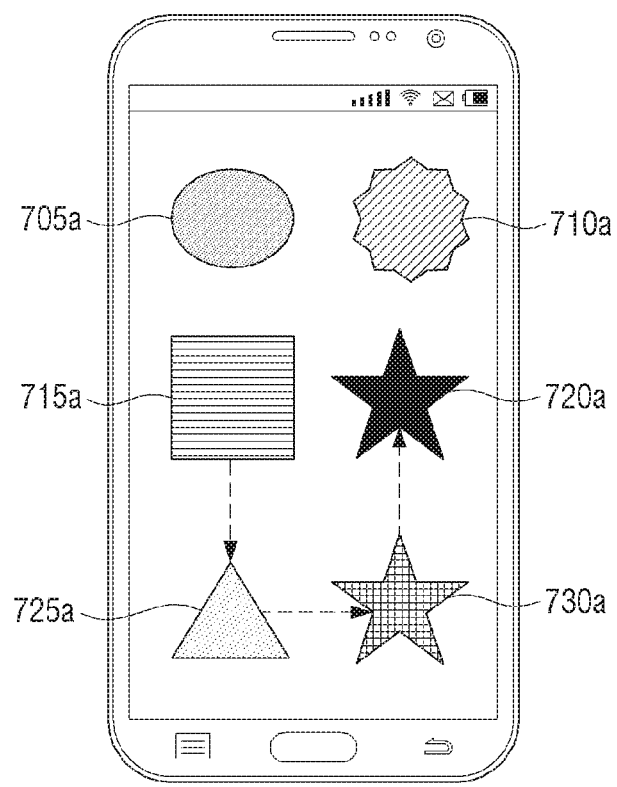
FIG. 7A is an exemplary illustration of configuration of an authentication window, in accordance with one exemplary embodiment.

FIG. 7A is an exemplary illustration of a step in configuration of a first authentication window, in accordance with one exemplary embodiment. FIG. 7A includes a plurality of objects 705a, 710a, 715a, 720a, 725a, and 730a. The plurality of objects 705a, 710a, 715a, 720a, 725a, and 730a have shapes with a pattern fill. The different pattern fill associated with each of the objects is referred to as attribute of the objects. A user is allowed to configure a password by selecting a set of objects from the layout of objects in a user-defined sequence. The password is generated based on the attribute associated with each of the objects in the set of objects selected.

In one embodiment, the user configures the password by using a plurality of strokes to sequentially connect a square 715a, a triangle 725a, a first star 730a and a second star 720a. A stroke may refer to a line from one object to another one. The square 715a has a horizontal stripes fill. The triangle 725a has a dotted fill. The first star 730a has a check-patterned fill. The second star 720a has a solid fill. An ellipse 705a and a ten point star 710a remain unused by the user. The dynamically generated authentication window generated from the authentication window in FIG. 7A is illustrated in FIG. 7E.

Figure 7B:
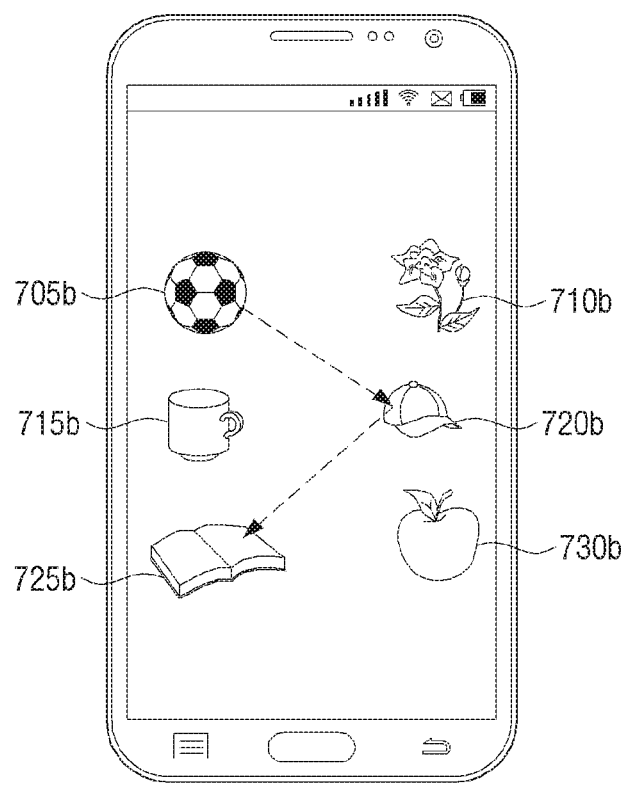
FIG. 7B is another exemplary illustration of configuration of authentication window, in accordance with one exemplary embodiment.

FIG. 7B is an exemplary illustration of a step in configuration of a second authentication window, in accordance with one embodiment. FIG. 7B includes a plurality of objects 705b, 710b, 715b, 720b, 725b, and 730b. The plurality of objects 705b, 710b, 715b, 720b, 725b, and 730b are images of articles of daily use. A user is allowed to configure a password by selecting a set of objects from the layout of objects in a user-defined sequence.

In one embodiment, the user may configure the password by connecting a ball 705b, a cap 720b, and a book 725b. A flower 710b, a cup 715b, and an apple 730b remain unused by the user. The dynamically generated authentication window generated from the authentication window in FIG. 7B is illustrated in FIG. 7F.

Figure 7C:
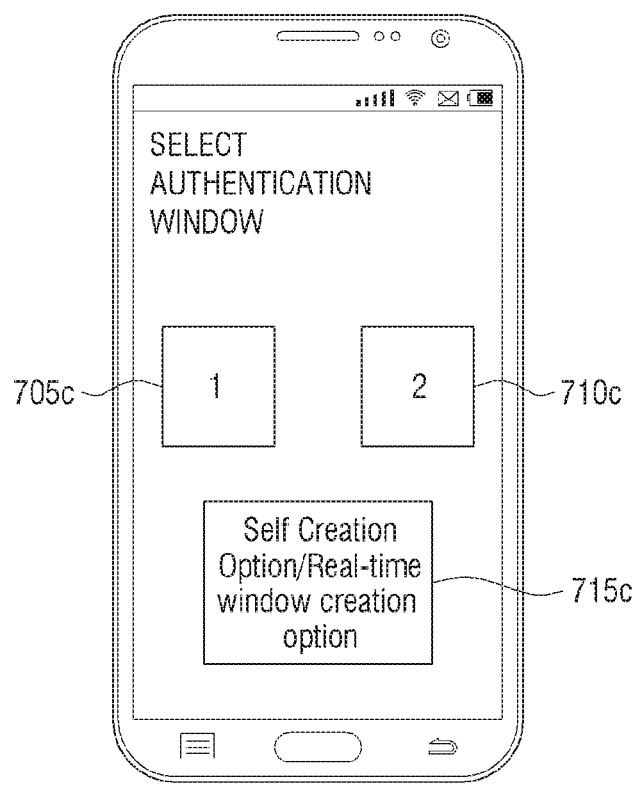
FIG. 7C is an exemplary illustration of an authentication window being selected to unlock a lock-screen, in accordance with one exemplary embodiment.

FIG. 7C is an exemplary illustration of an operation of selecting an authentication window to unlock a lock-screen, in accordance with one exemplary embodiment. The authentication window includes a first icon 705c, a second icon 710c and a third icon 715c. The first icon 705c represents a first authentication window configured in FIG. 7A. The second icon 710c represents a second authentication window configured in FIG. 7B. The third icon 715c represents an option to generate a self-creation authentication window. The self-creation authentication window is also referred to as a real-time authentication window.

Figure 7D:
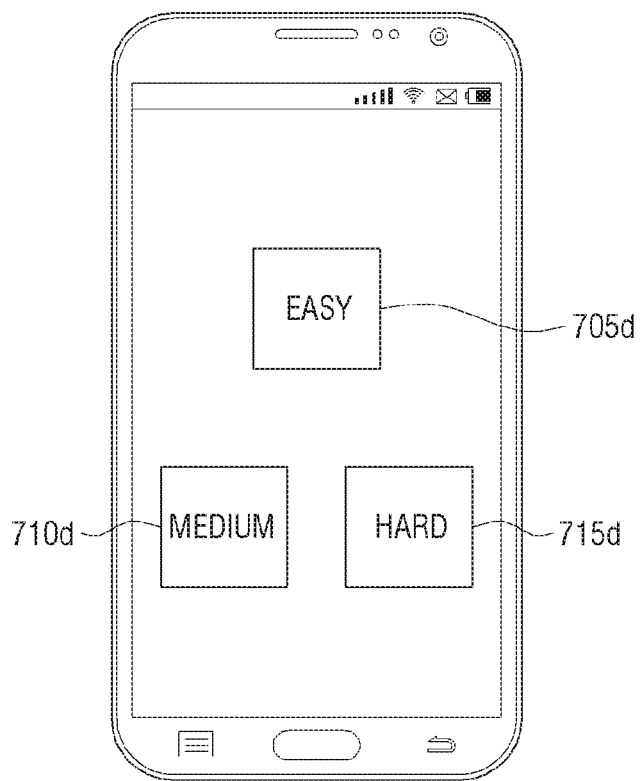
FIG. 7D is another exemplary illustration of an authentication window being selected to unlock a lock-screen, in accordance with another exemplary embodiment.
Figure 7E:
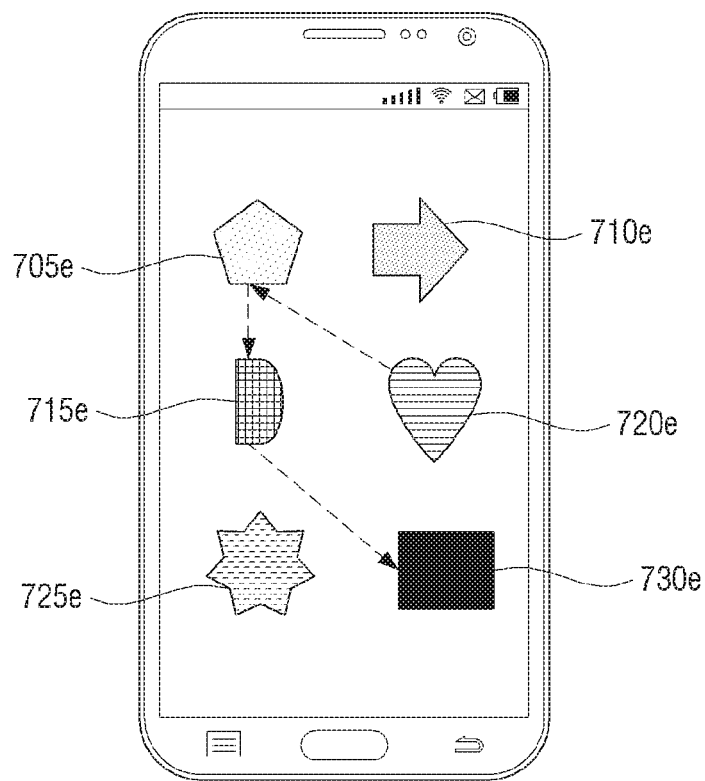
FIG. 7E is an exemplary illustration of a lock-screen being unlocked, in accordance with one exemplary embodiment.
Figure 7F:
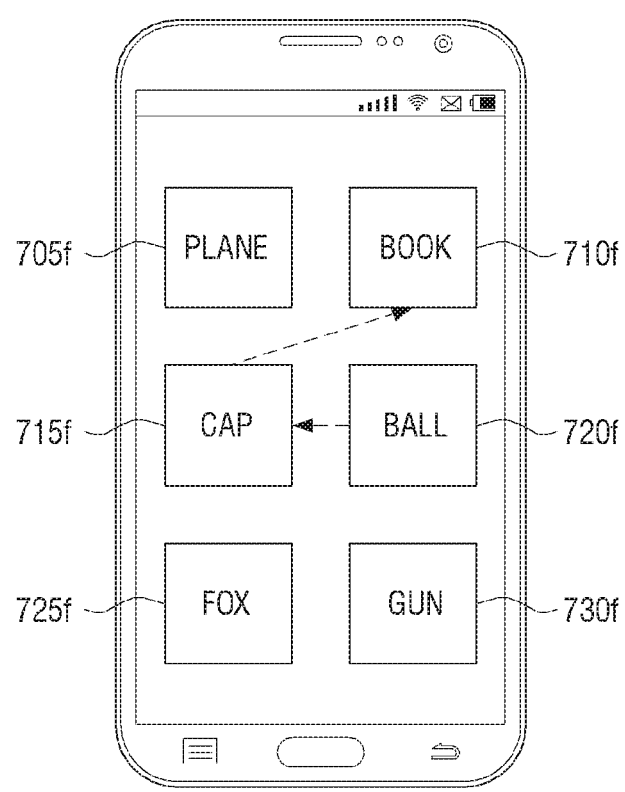
FIG. 7F is another exemplary illustration of a lock-screen being unlocked, in accordance with one exemplary embodiment.

FIG. 7D is another exemplary illustration of an operation of selecting an authentication window to unlock a lock-screen, in accordance with another exemplary embodiment. The authentication window includes a plurality of icons 705d, 710d, and 715d which are associated with different security strength. A user is allowed to select an icon from the plurality of icons 705d, 710d, and 715d. A first icon 705d represents a low-level authentication window. The low-level authentication window provides easy access to an electronic device. The number of dummy objects in the low-level authentication window is very low. Moreover, the low-level authentication window allows the user to unlock the lock-screen with a simple password. The low-level authentication window provides limited protection from unauthorized access. The user may be allowed to select the easy authentication window to unlock the lock-screen during absence of unauthorized users in vicinity of the electronic device. A second icon 710d represents a medium-level authentication window. The number of dummy objects in the medium-level authentication window may be higher than the number of dummy objects in the low-level authentication window. A third icon 715d represents a high-level authentication window. It is noted that number of dummy objects in the hard authentication window is higher than the number of dummy objects in the low-level authentication window and the number of dummy objects in the medium-level authentication window. The high-level authentication window allows the user to unlock the electronic device with a complex password and provides the strongest security among the three levels of the authentication windows. For example, the user may select the high-level authentication window to unlock the lock-screen when a plurality of unauthorized users are present in vicinity of the electronic device.

FIG. 7E is an exemplary illustration of an operation of unlocking a lock-screen, in accordance with one exemplary embodiment. FIG. 7E includes a plurality of objects 705e, 710e, 715e, 720e, 725e, and 730e in a dynamically generated authentication window. The dynamically generated authentication window is generated from a first authentication window configured in FIG. 7A. However, the objects in the FIG. 7A do not appear in the dynamically generated authentication window of FIG. 7E. The existing objects of FIG. 7A are replaced with new objects which share attributes with the existing objects. For example, the square 715a with a horizontal stripes fill in FIG. 7A is replaced with a heart 720e with a horizontal stripes fill. The triangle 725a with a dotted filling in FIG. 7A is replaced with a pentagon 705e with a dotted fill. The first star 730a with a check-patterned fill in FIG. 7A is replaced by a semicircle 715e with a check-patterned fill. The second star 720a with a solid fill in FIG. 7A is replaced with a square 730e with a solid fill. As a result, a valid authentication password is obtained by connecting the heart 720e, the pentagon 705e, the semicircle 715e and the square 730e. An arrow mark 710e and a seven point star 725e are dummy objects in the dynamically generated authentication window. The user is authenticated on entering the valid authentication password.

FIG. 7F is another exemplary illustration of a step in unlocking a lock-screen, in accordance with one exemplary embodiment. FIG. 7F includes a plurality of objects 705f, 710f, 715f, 720f, 725f, and 730f in a dynamically generated authentication window. The dynamically generated authentication window is generated from a second authentication window configured in FIG. 7B. However, the objects in the FIG. 7B do not appear in the dynamically generated authentication window of FIG. 7F. The existing objects in FIG. 7B are replaced with new objects which share attributes with the existing objects. For example, the image of a ball 705b in FIG. 7B is replaced with a first icon 720f with a word "BALL" written. The image of a cap 720b in FIG. 7B is replaced with a second icon 715f with a word "CAP" written. The image of a book 725b in FIG. 7B is replaced with a third icon 710f with a word "BOOK" written. As a result, the valid authentication password is obtained by connecting the first icon 720f, the second icon 715f, and the third icon 710f. Icons 705f, 730f, and 725f are dummy objects in the dynamically generated authentication window.

As such, the present embodiments implement a lock-screen with dynamically generated authentication windows. The present embodiments allow a user to configure a plurality of authentication windows and select an authentication window from the plurality of authentication windows. Privacy of an authorized user may be protected by increasing the complexity of the lock-screen.

Figure 8:
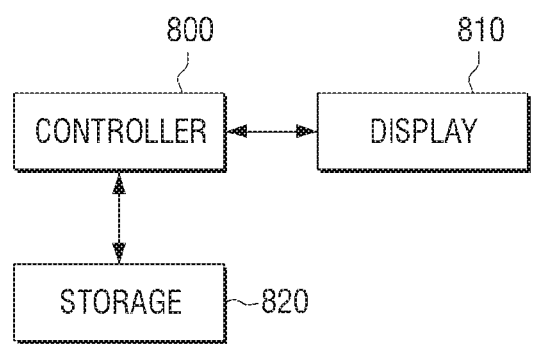
FIG. 8 is a detailed block diagram of an electronic device in accordance with another exemplary embodiment.

FIG. 8 is a detailed block diagram of an electronic device in accordance with another exemplary embodiment.

As shown in FIG. 8, an electronic device 790 in accordance with another exemplary embodiment partly or entirely includes a controller 800, a display 810 and a storage 820.

By stating that the embodiment "partly or entirely includes" components, it means that part of the components such as storage 320 may be omitted or integrally incorporated with another component such as the controller 800, although it is assumed herein that all of the components are included for the sake of sufficient understanding.

Compared with the electronic device 100 of FIG. 1, the controller 800 of the electronic device 790 of FIG. 8 may serve as the configurator 105 and the authenticator 125 of FIG. 1. For example, the controller 800 may include a graphic user interface (GUI) generator (not illustrated)

which may be identical or similar to the configurator 105 of FIG. 1, through which the controller 800 may generate various screens to be displayed on the display 810 and provide the user with the same. In this process, the controller 800 may provide the storage 820 with the stored screen. The embodiment will not be limited specifically to the examples described above, since various modifications are possible.

Additionally, the controller 800 may include a central processing unit (CPU) and a memory in a hardware sense, although the controller 800 may be implemented as a single software. The memory may include and execute a program to perform a user authentication operation according to an embodiment.

To summarize, the controller 800 controls so that an authentication widow with dynamically changing objects appears in every authentication, on the lock-screen of the display 810 in response to a user request. By stating that the "objects change in every authentication", it means that the displayed objects dynamically change every time authentication is conducted. Change of the objects may include change in the shapes of the objects, while the attributes of the objects previously defined by the user such as patterns or colors remain the same. Further, the authentication window may additionally include dummy objects, as described above, to increase complexity and strength of authentication. Furthermore, when the user selects certain object or select a plurality of objects in association, information about the corresponding selected objects may be received as authentication information. The authentication information may be attributes of the objects, and may additionally include sequence of connecting the plurality of objects.

The controller 800 may then compare the authentication information stored at the storage 820 with the authentication information that uses the object selected by the user, to determine if the authentication information match with each other. The authentication information stored at the storage 820 is previously defined by the user using the objects displayed on the screen, and may use attributes or information like sequence of connection. In response to determining that the authentication information match with each other, the controller 800 unlocks the lock-screen displayed on the display 810. The objects configured to preset the authentication information may have the same attributes as the objects displayed in every authentication, although the shapes of the objects are different.

As described above, the controller 800 performs the overall operations of the configurator 105, the authenticator 125 and the controller 135 of FIG. 1, and these will not be explained in detail below for the sake of simplicity.

The display 810 and the storage 820 are also referenced to the explanation about the display 115 and the storage 130 of FIG. 1 described above, since there is little difference.

Figure 9:
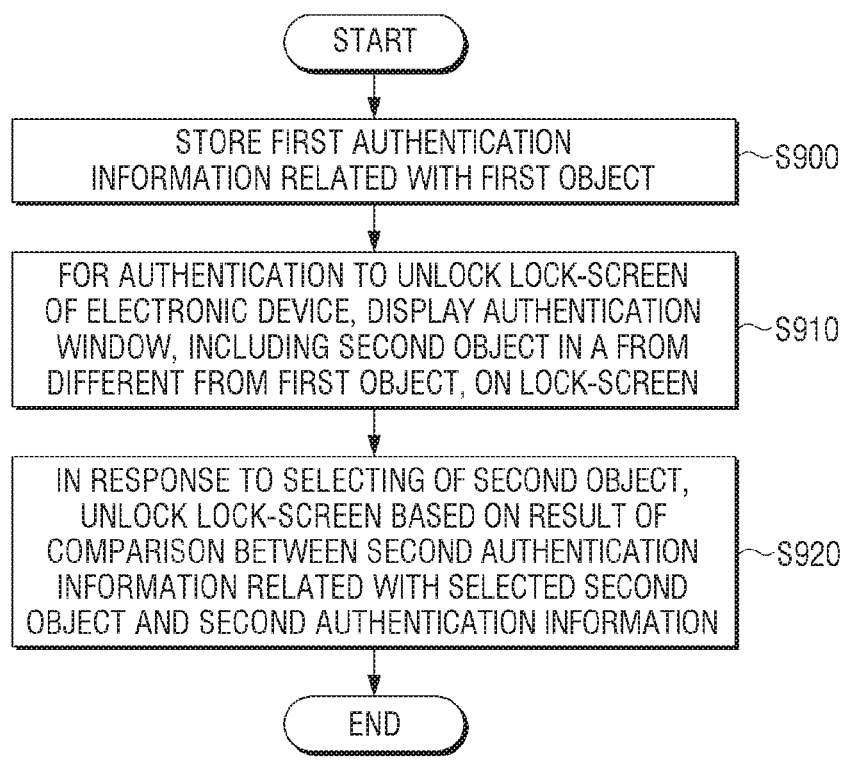
FIG. 9 is a flowchart illustrating a process of authenticating a user, in accordance with another exemplary embodiment.

FIG. 9 is a flowchart illustrating a process of authenticating a user in accordance with another exemplary embodiment.

For convenience of explanation, FIG. 9 will be referenced along with FIG. 8 below. According to another embodiment, at step 900, the electronic device 790 stores authentication information related with at least object 1 (also referred to as a first object or a second object) designated by the user.

Various information may be stored. For example, attributes for only one object (object 1) may be stored, and information that determines number and types of the displayed dummy objects may also be stored. When there is a plurality of objects 1, information about sequence of connection may additionally be stored along with the attributes. The information about sequence of connection may refer to a lock screen pattern. As described, various information may be stored in relation with the authentication information, and in general, the user may be involved in the authentication information generating process. Of course, the embodiments are not strictly limited to the examples provided above, considering that dummy objects can be determined by default, i.e., without requiring user intervention. For example, in response to detecting a plurality of users around the user, the electronic device 790 may need to increase complexity for authentication. Accordingly, the electronic device 790 may increase the number of the dummy objects. As described, the electronic device 790 may determine dummy objects by default, depending on result of detection. To this purpose, the electronic device 790 may photograph the surroundings using a photographic means such as a camera, and analyze the photographed images.

At step 910, for the authentication to unlock the lock-screen, the electronic device 790 displays an authentication window on the lock-screen, which includes object 2 (also referred to as the first object if object 1 is referred to as the second object, and referred to as the second object if object 1 is referred to as the first object) which is changed into a shape different from the object 1.

In this process, at step 910, in every authentication, the electronic device 790 displays on the lock-screen at least one option item to generate authentication window in which object 2 is displayed in changed form, and display an authentication window generated on the basis of the selected option item on the lock-screen. The authentication window with object 2 which is changed and displayed in every authentication, is regarded as being dynamically generated, while the object is generated randomly.

As illustrated in FIGS. 7C and 7D, the option items may be used to select one shape from among a plurality of authentication windows or to display self-creation authentication window, and furthermore, may be used to select various forms of authentication information pattern configurations such as the number of dummy objects, passwords, etc. This has been explained above and will not be repeated below for the sake of brevity.

At step 920, in response to object 2 being selected, the electronic device 790 compares second authentication information associated with the selected object 2 with the stored first authentication information and unlocks the lock-screen according to a result of the comparison. The authentication information may be, for example, attributes of the selected object, or may additionally include information about sequence of connecting a plurality of objects.

The object 1 as mentioned in FIG. 9 may be named "first object" or "second object". Accordingly, when object 1 is the first object, object 2 may be named "second object". On the contrary, when object 1 is the second object, object 2 may be named the "first object".

Figure 10:
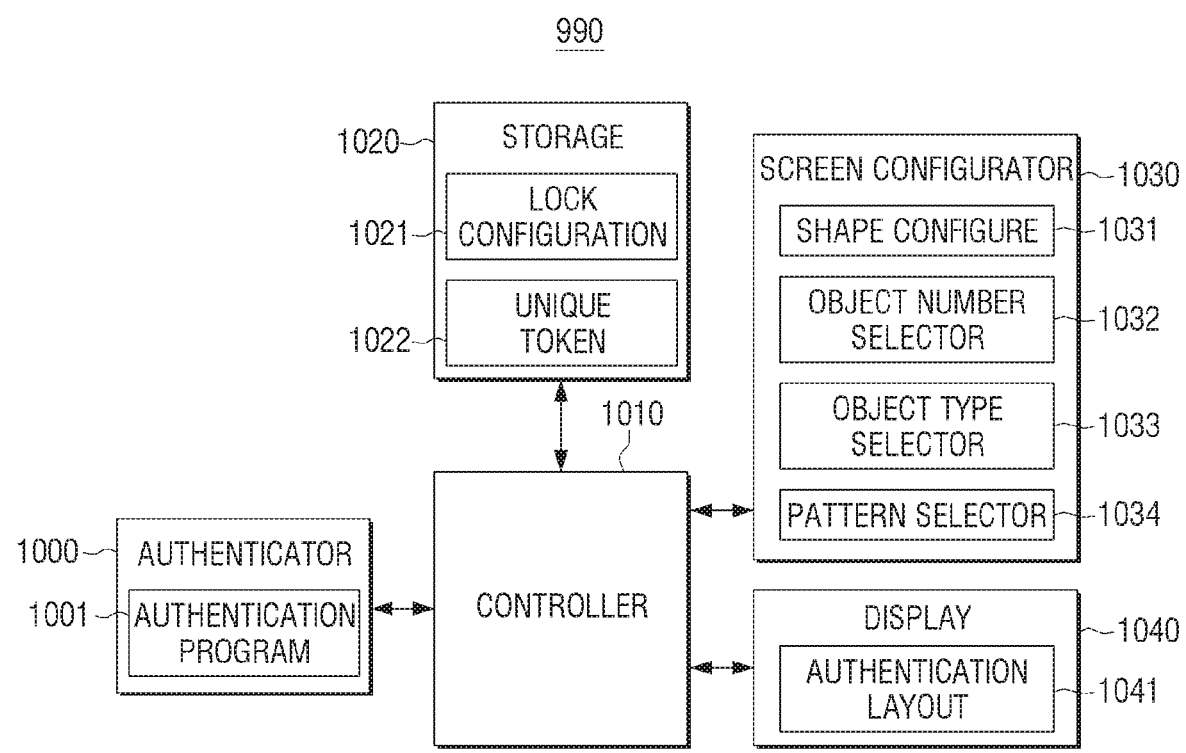
FIG. 10 is a detailed block diagram of an electronic device in accordance with yet another exemplary embodiment.

As illustrated in FIG. 10, the electronic device 990 may partly or entirely include an authenticator 1000, a controller 1010, a storage 1020, a screen configurator 1030, and a display 1040.

By stating that the embodiment "partly or entirely includes" components, it means that part of the components such as storage 1020 may be omitted, or part of the components such as the authenticator 1000, the storage 1020 and the screen configurator 1030 may be integrally incorporated with another component such as the controller 1010, although it is assumed herein that all of the components are included for the sake of sufficient understanding.

The electronic device 990 of FIG. 10 has little difference from the electronic device 100 of FIG. 1. Accordingly, it may well be understood that the configurator 105 of the electronic device 100 illustrated in FIG. 1 includes the screen configurator 1030 illustrated in FIG. 10, although the embodiments are not strictly limited to this example.

As described above with reference to FIG. 1, the electronic device 990 of FIG. 10 may display a layout shape along with user-selectable random objects on the display 1040 during the process the user is configuring lock-screen or authentication window on the lock-screen, generate a token for the purpose of user authentication based on the pattern selected by the user, and store the generated authentication window and the token at the storage 1020, respectively.

To this purpose, the screen configurator 1030 may include a software module that processes information about shapes, number, types of selected objects and a pattern connecting the selected objects to generate an authentication window. Of course, this module may be configured to be hardware, partly or entirely. The lock configuration, i.e., the authentication window generated through the screen configurator 1030 and the unique token are stored at the storage 1020 under control of the controller 1010.

Figure 11:
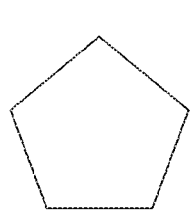
FIG. 11 is exemplary illustration of selectable shapes.
Figure 11:
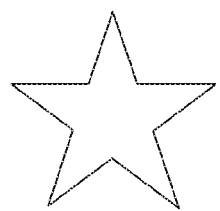
Figure 11:
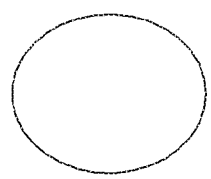
Figure 11:
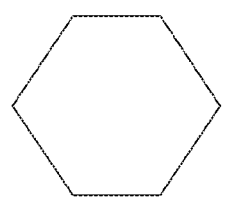
Figure 12:
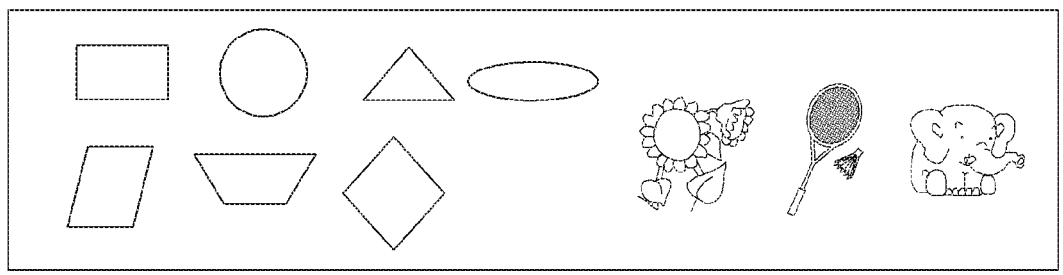
FIG. 12 is exemplary illustration of selectable objects.

To be more specific, the screen configurator 1030 may process a user interface (UI) screen as the one illustrated in FIGS. 11 to 13 to request a UI in order to configure lock-screen, i.e., authentication window in need of user's input, or process received data in response to a request. For example, when a plurality of UI screens are provided to the display 1040 to select a layout shape, a number of selected objects, or a type of the selected objects, the screen configurator 1030 may process information that is inputted through the same. To this purpose, the screen configurator 1030 may include a shape selector 1032, an object count selector 1032, and an object type selector 1033. The data processed by such screen configurator 1030 may be sent to and stored at the storage 1020 under control of the controller 1010.

For example, the authenticator 1000 determines whether the pattern information as twice inputted by the user match with each other, based on the layout shape (FIG. 11) and the number and type of the selected objects (FIG. 12) which are generated by the screen configurator 1030 and displayed on the display 1040. The authenticator 1000 may provide the result of the determination to the controller 1010.

The controller 1010 may generate unique token, using the data inputted by the user based on the layout shape and the number and type of the selected objects, in accordance with the result of authentication at the authenticator 1000. In other words, when the authentication is successful, the controller 1010 carries out the process of generating unique token, while when the authentication fails, the controller 1010 may provide the user with an error message. The controller 1010 has the generated unique token stored at the storage 1020.

Figure 14:
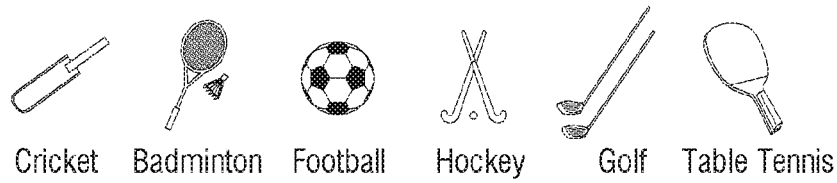
FIG. 14 is another exemplary illustration of selectable objects.
Figure 14:
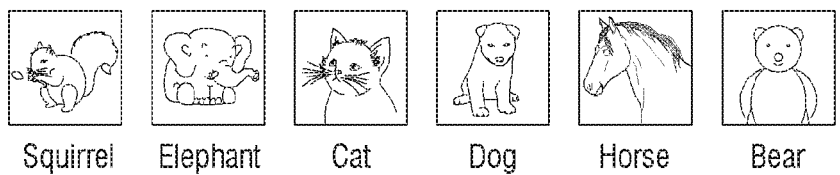
Figure 14:
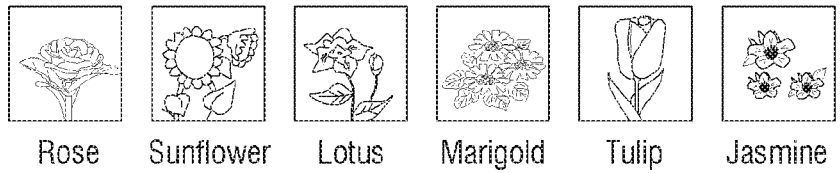

As will be described again, each of the objects may be cubes in different colors, and have IDs such as colors or names as illustrated in FIG. 14. For example, the objects may be a finite number of images, in which the ID of an image such as name or color may begin with unique alphabet. The first alphabet of an ID may be the unique ID. Accordingly, the controller 1010 may check the IDs of the objects swiped by the user, and combine the unique IDs (i.e., first alphabet of each of the IDs) to generate a token. In one embodiment, the generated token is named a "unique token". Accordingly, the number of alphabets in a token may match with the number of objects that are selected or swiped. The unique token generated according to the process described above is used to unlock the lock-screen, i.e., used for authentication purpose. For example, the information about ID such as color or name may be stored at the storage 1020. Additionally, in response to selecting of a certain object on the screen, the controller 1010 may retrieve the ID information of the selected object from the storage 1020 to use it when generating tokens.

The display 1040 displays on screen, for example, an authentication layout (i.e., authentication window) generated by the user so that authentication to unlock the lock-screen is carried out therethrough.

For example, the controller 1010 may generate a reference code in the similar manner as the process of generating a unique token described above, based on the information inputted by the user through the authentication window provided on the screen, carry out authentication by comparing the generated reference code with the unique token 1022 stored at the storage 1020, and unlock the lock-screen according to result of authentication.

If the codes do not match, the controller 1010 may realign the objects randomly, and may even change the shape when the number of matching failure exceeds a limit. For example, shape "circle" with five objects may be changed into pentagon or star with five vertices.

Figure 15:
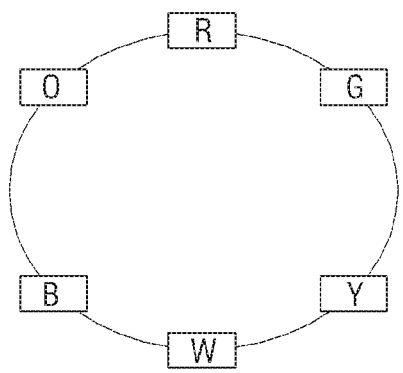
FIGS. 15 and 16 illustrate various examples of layouts configurable by a user.
Figure 16:
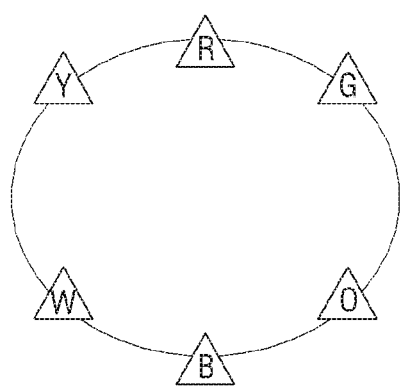
Figure 16:
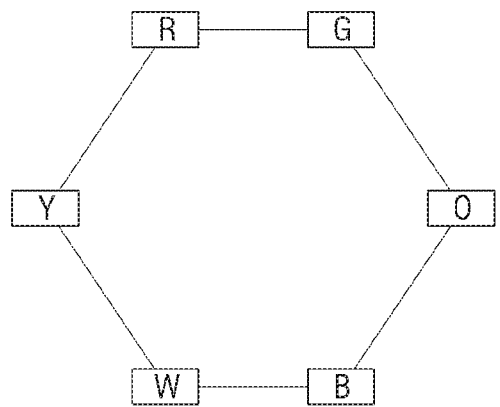
Figure 16:
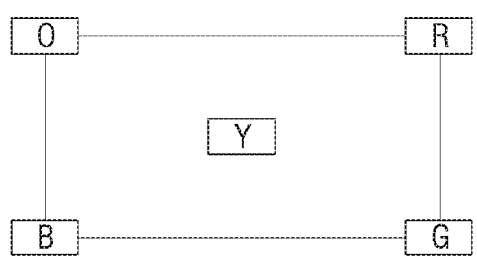
Figure 16:
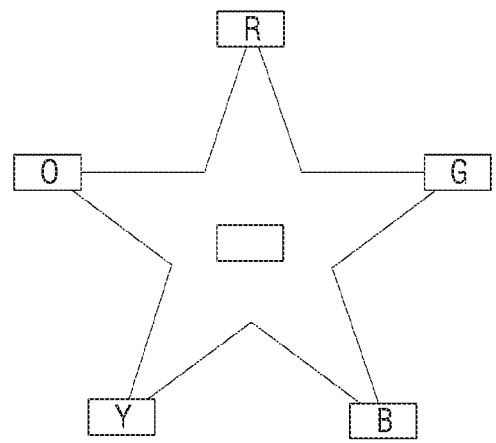

FIGS. 15 and 16 illustrate various examples of layout configurable by a user.

Referring to FIG. 15 and also to FIGS. 10 to 13 for convenience of explanation, the electronic device 990 shows the layout when the user selects shape as a circle (FIG. 11), a rectangle (FIG. 12), and selects six different IDs (i.e., red, green, yellow, white, black and orange) as illustrated in FIG. 13.

Likewise, FIG. 16 also shows the layout screen (i.e., authentication window) formed in response to a user selecting a layout shape, an object and an ID of the object, as illustrated in FIG. 15.

The shape may be determined in accordance with the number of selected objects. Accordingly, embodiments are not strictly limited to a specific example of selecting shapes. For example, in response to a user selecting "5" as the number of objects, pentagon or star with five vertices may be determined and displayed, while for "6", hexagon or star with six vertices may be determined and displayed. Further, for number of objects exceeding "6", a circle may be determined and displayed. Furthermore, the shape may be perceived by the user based on arrangement of the objects, rather than actually being displayed on the screen.

Additionally, the user may set password information by drawing a pattern on the layout screen as illustrated in FIGS. 15 and 16. Based on this, unique token may be generated as the password information and stored in advance.

For example, in response to the user swiping (i.e., drawing) a pattern in the order of Red, Green, Yellow, White, Black and Orange on the layout screen illustrated in FIG. 15, the unique token as acquired from each of the first alphabets may form "RGYWBO". Accordingly, the user may draw a pattern of objects on the authentication window displayed on screen, and has successful authentication when the acquired reference code matches with the generated unique token.

Figure 17C:
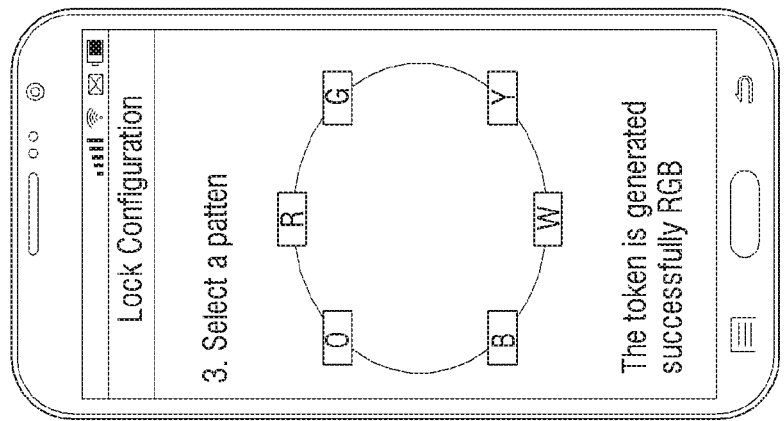
FIGS. 17A, 17B, and 17C are views provided to explain a process of configuring an authentication window by a user.
Figure 17B:
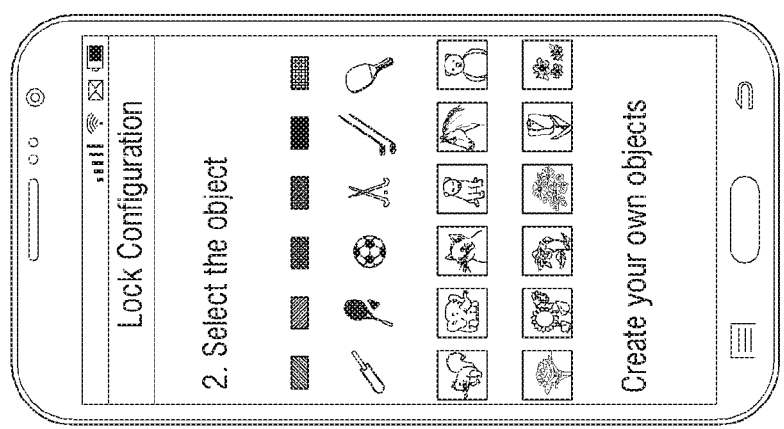
Figure 17A:
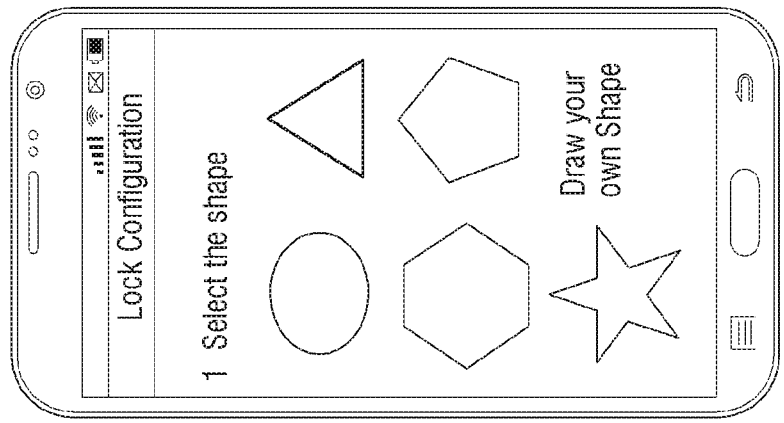
Figure 18:
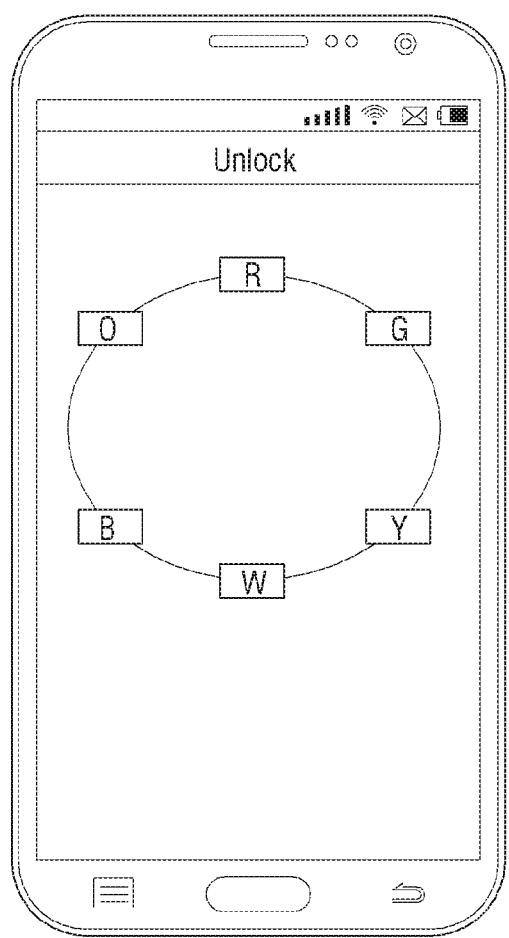
FIG. 18 is exemplary illustration of a preset authentication window.

FIGS. 17A-17C are views provided to explain a process of configuring an authentication window by a user, and FIG. 18 is an exemplary view of a preset authentication window.

For convenience of explanation, FIGS. 17A-C will be referenced along with FIG. 10. For example, when a user touches a lock-screen of the electronic device 990 in a state that the lock-screen is displayed, an option may be displayed on the screen, asking whether to configure an authentication window or not. For example, when a user wants to self-generate an authentication window on the screen as illustrated in FIG. 7C, the electronic device 990 may perform a process corresponding to FIG. 17A to FIG. 17C.

First, the electronic device 990 may determine an arrangement of objects as he/she wants to show, as illustrated in FIG. 17A. Of course, such process of selecting a shape may be omitted, as mentioned above. In other words, the number of selected objects on the screen may be used for such determination, as in FIG. 17B.

For convenience of explanation, in response to the user selecting a circle on screen of FIG. 17A, the electronic device 990 may display the screen of FIG. 17B. The user may in turn select a colored rectangle on screen FIG. 17B.

When the process completes, the electronic device 990 may display the layout according to the user-selected shape and objects on the screen, as shown in FIG. 17C.

Then when the user completes configuring an authentication window, the electronic device 990 may generate a unique token as password information, using the identification items (i.e., IDs) of the currently-selected objects. The generated unique token may not include sequence information as the password information.

However, described above, when the user additionally inputs sequence information on the screen of FIG. 17C, the authentication may be successful only when the sequence of objects displayed on the authentication window is accurately swiped.

Accordingly, the embodiments may adopt a variety of manners to configure authentication window and generate token using the same. For example, token information may be generated even when the sequence information is not included. Accordingly, the embodiments are not strictly limited to the examples provided above.

Figure 19:
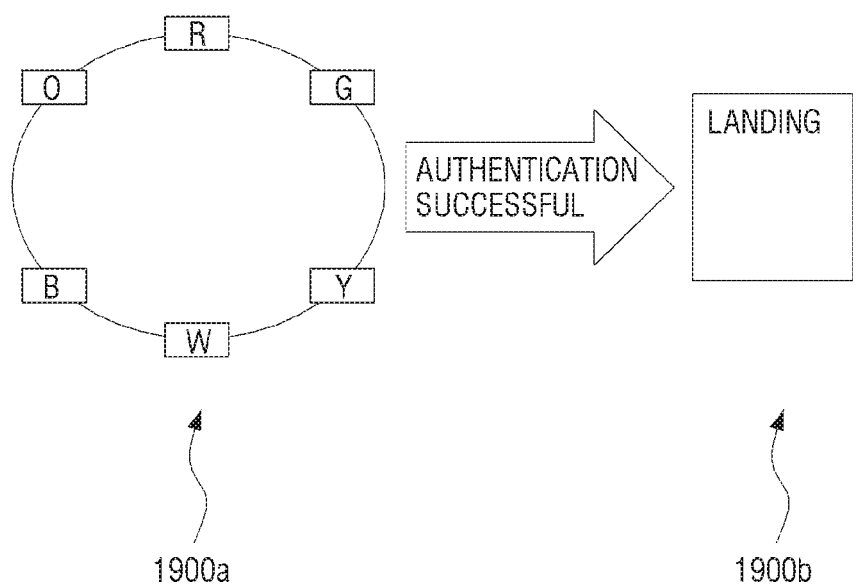
FIGS. 19 to 21 illustrate various exemplary implementations of a screen, displayed depending on whether authentication is successful or not.
Figure 20:
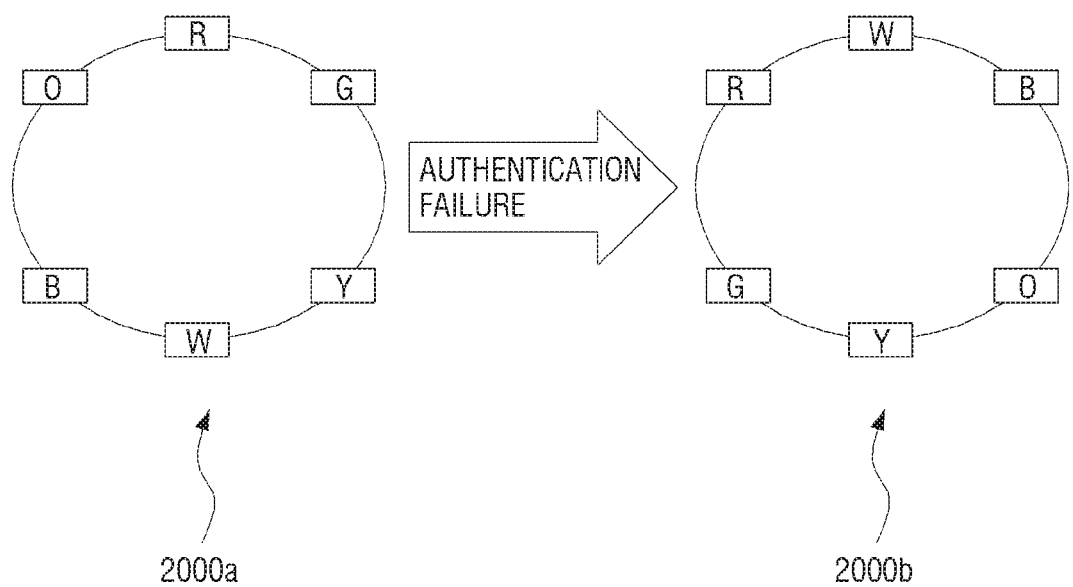
Figure 21:
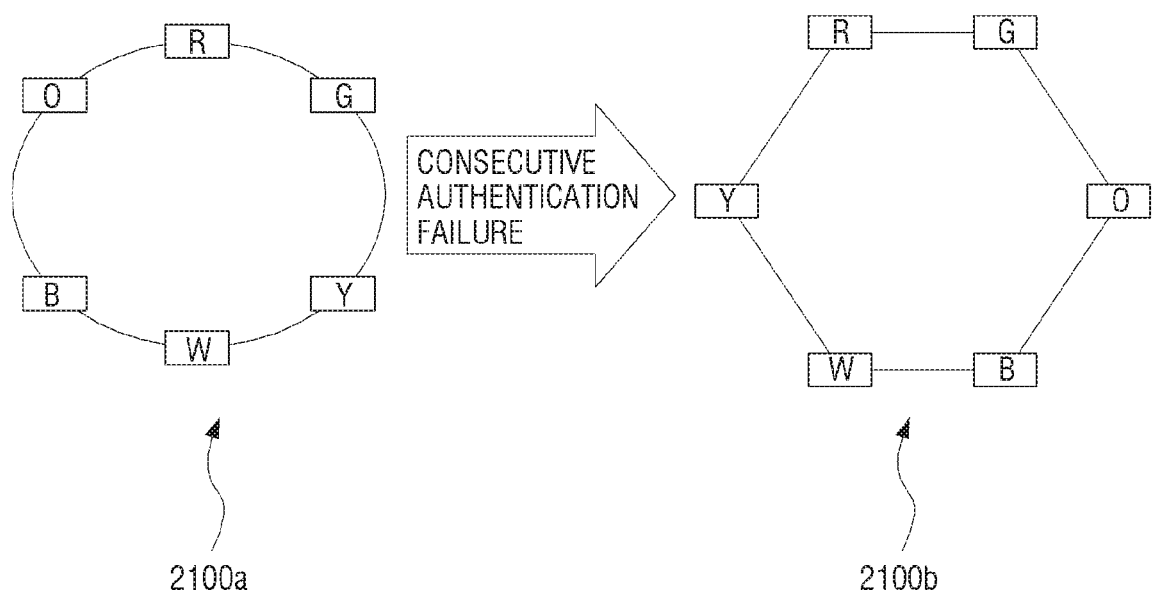

FIGS. 19 to 21 illustrate various implementations of the screen that is displayed depending on whether the authentication is success or failure.

Referring to FIGS. 19 to 21 and also to FIG. 10 for convenience of explanation, the electronic device 990 (FIG. 10) may display the authentication window as the one illustrated in FIG. 19, in response to a user's request to a screen (e.g., lock-screen). For example, when the preset unique token has "RGYWBO" as the token information and the reference code generated by a user as a result of accurately swiping the pattern of the objects displayed on the screen matches with such token information, the electronic device 990 determines that the authentication is successful and may display the landing screen as illustrated in FIG. 19. The "landing screen" as used herein may refer to a background screen or main screen on which a variety of menus are displayed.

The authentication process will be explained in detail below. The electronic device 990 previously stores in the memory the ID information about the objects displayed on the screen. For example, as described with reference to FIG. 14, an ID may be a color name, a sports name, an animal name or a flow name represented in a text (e.g., alphabetic) form. In response the user selecting objects on FIG. 19 and drawings a pattern, based on the information of the objects selected in order, the stored IDs of the objects may be extracted from the memory. The electronic device 990 then generates a reference code by acquiring the first alphabets from the extracted IDs. The electronic device 990 may then perform authentication by comparing the generated reference code with token information of the previously-stored unique token. For example, as to the matter of determining which of the objects is selected, because the electronic device 990 knows the coordinate information of the objects displayed on the authentication window, the electronic device 990 may determine the selected object in a manner of matching the coordinate information of the object selected on the touch screen with the coordinate information of displaying such object. Of course, this is only an example and various other manners may be adopted.

If authentication fails, as illustrated in FIG. 20, the electronic device 990 may randomly rearrange the order of objects displayed on the authentication window, display these again, and request the user to draw a pattern again.

In such process, when the user fails the authentication by exceeding a limit, in order to increase security level, the arrangement of the objects may be additionally changed, as illustrated in FIG. 21. This would increase a security level by causing a user visual confusion.

Various other methods may be used to increase the security level. That is, dummy objects, which are not actually used for the purpose of unlocking the screen, may be additionally displayed. This has been explained above and will not be redundantly repeated for the sake of brevity.

Figure 22:
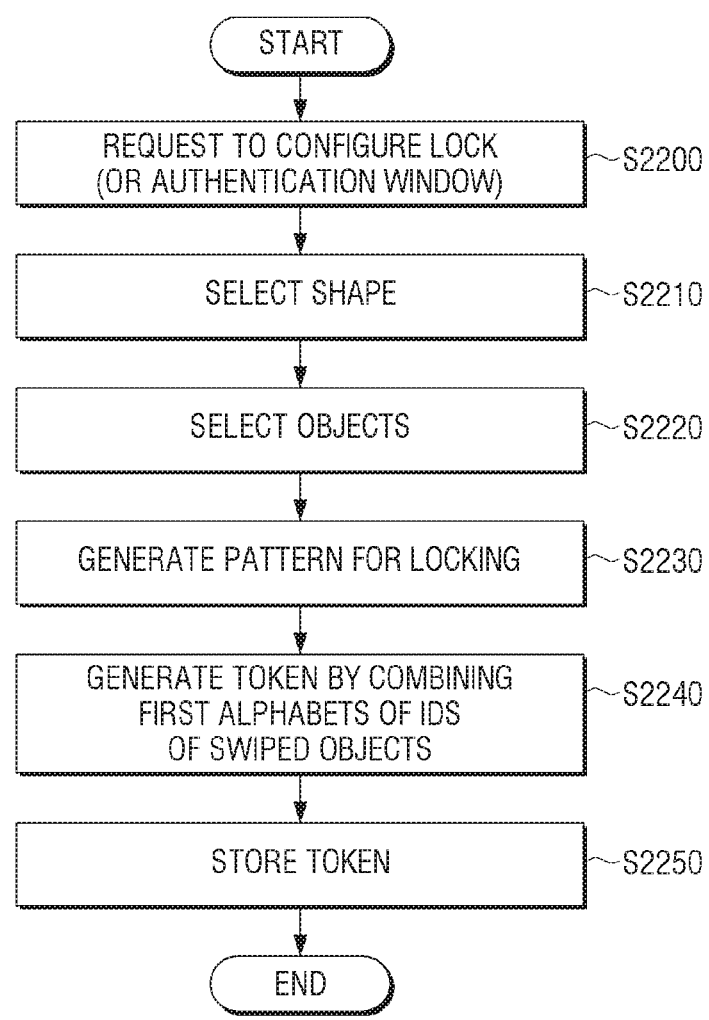
FIG. 22 is a flowchart illustrating a process of configuring an authentication window.

FIG. 22 is a flowchart illustrating a process of configuring an authentication window.

Referring to FIG. 22 and also to FIG. 10 for convenience of explanation, at step 2200, the electronic device 990 according to another exemplary embodiment may receive a request for authentication window configuration. For example, when the user touches the lock-screen of the electronic device 990, the electronic device 990 may determine the touch as a request. Alternatively, the option information as the one illustrated in FIG. 7C may be displayed in response to the touch, and it may be determined that a request is made when the user selects an item for self-creation.

At step 2210, in response to a corresponding request, the electronic device 990 may select a shape to determine an arrangement of the objects. This process may be optional. That is, as mentioned above, when the objects are displayed in advance, the shape may be determined automatically (i.e., by default) based on the number of selected objects.

For example, at step 2220, when selecting a shape is completed, the electronic device 990 may request the user to select the objects. Additionally, the user may additionally carry out process of selecting identity (FIG. 13), when the selected object is not identified.

At step 2230, the electronic device 990 may then additionally request the user for a pattern for lock. Again, this may be optional. That is, the operation may be performed without this process. In other words, because the pattern represents the order of the selected objects, such process may not be essentially requested.

At steps 2240 and 2250, when the user completely carries out setting operation until pattern inputting, a token is generated by combining the first alphabets of the IDs of the selected objects and the generated token is stored as the unique token. The stored unique token is used later for unlocking the lock-screen.

Figure 23:
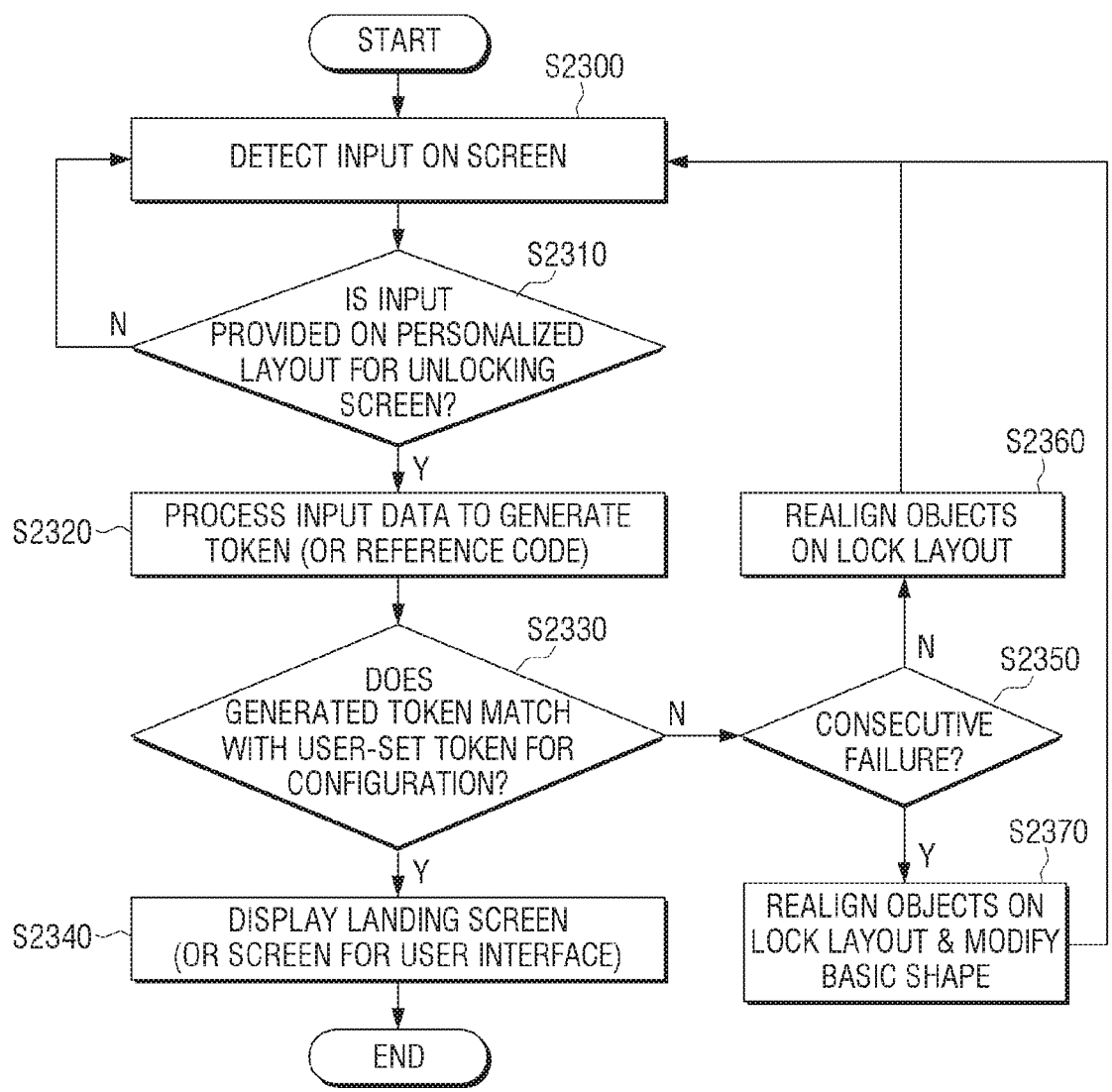
FIG. 23 is a flowchart provided to explain an authentication process using token information previously generated by the process of FIG. 22.

FIG. 23 is a flowchart provided to explain an authentication process using previously generated token information by the process of FIG. 22.

Referring to FIG. 23 and also to FIG. 10 for convenience of explanation, at step 2300, the electronic device 990 detects a user input received through the lock-screen. That is, the electronic device 990 may detect a screen touch and a pattern of the touch.

At step 2310, the electronic device 990 then determines whether an input is made on the personalized authentication window layout. For example, the electronic device 990 may determine whether the first icon 705*c* or the second icon 710*c* is selected in FIG. 7C as described above.

At step 2320, in response to determining a presence of a corresponding input, the electronic device 990 performs an operation to generate token information, or to be more specific, a reference code, using the selected objects on the authentication window.

At step 2330, when the generation is finished, the electronic device 990 determines if the generated reference code matches with the token information of the stored unique token.

At step 2340, when the determination indicates matching, the electronic device 990 may display a landing screen, for example, a main screen with menus displayed thereon, or may display various other screens for user interface. For example, a message screen may be directly displayed, when there is a message received.

At steps 2350 to 2360, when the authentication fails at step 2330, depending on whether or not the number of failures exceeds a limit, the electronic device 990 may realign the objects on the layout or change the arrangement and display the same again on the screen.

For example, the limit may include a first limit and a second limit. Accordingly, the authentication process may be terminated when the second limit is exceeded.

All the constituent elements described above may be coupled as one single body or operated in association with each other. That is, each of the constituent elements may be selectively coupled with one or more of the others and operated. Further, while each of the constituent elements may be independently implemented as one single hardware, part or all of each of the constituent elements may be selectively combined and implemented as a computer program having a program module configured to perform part or all of the combined functions of one or a plurality of hardware. Those skilled in the art will be easily able to infer codes and code segments to configure the computer program. This computer program may be stored on a non-transitory computer readable recording media, to implement the embodiments as this is read out and executed by a computer.

The non-transitory computer readable recording media refer to media that store data semi-permanently and readable by a device, rather than media that store data for a short period of time, such as register, cache or memory. To be specific, the programs described above may be stored on a non-transitory computer readable recording media such as CD, DVD, hard disk, Blu-ray disk, USB, memory card or ROM and provided.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An electronic device, comprising:
    a display;
    a memory configured to store a password which corresponds to an order of selection of a predetermined attribute among a plurality of attributes and is set based on selection of a first plurality of objects respectively having the plurality of attributes; and
    a processor device configured to:
        based on an event for unlock occurring, control the display to display a user interface (UI) including a second plurality of objects that is different from the first plurality of objects, the second plurality of objects respectively having the plurality of attributes and at least one dummy object, wherein the at least one dummy object is not designated to be used when forming the password; and
        based on at least two objects being selected from among the second plurality of objects included in the UI, perform an unlock operation based on attributes of the selected at least two objects corresponding to the order of selection corresponding to the password.

2. The electronic device as claimed in claim 1, wherein the plurality of attributes include at least one of a shape, a color, and a pattern, and
    wherein the password is set based on attribute information based on any one of the shape, the color, and the pattern and an the order of selection of the attribute information.

3. The electronic device as claimed in claim 1, wherein the processor device is configured to, based on the at least two objects being selected from among the second plurality of objects included in the UI, perform the unlock operation by comparing orders of selection of attribute information set to have the password from among a plurality of attributes of each of the selected at least two objects.

4. The electronic device as claimed in claim 1, wherein the processor device is configured to generate the second plurality of objects included in the UI by combining a first attribute set to have the password and a second attribute excluding the first attribute from the plurality of attributes.

5. The electronic device as claimed in claim 1, wherein the processor device is configured to control the display to display a user interface (UI) including an authentication object including first attribute information of the first attribute set to have the password, and a dummy object including second attribute information of the first attribute, and
    wherein the second attribute information is different from the first attribute information.

6. The electronic device as claimed in claim 1, wherein the processor device is configured to:
    control the display to display a user interface (UI) for password setting which includes a plurality of objects respectively having the plurality of attributes; and
    store, as the password, attribute information corresponding to the predetermined attribute from among a plurality of attributes of an object selected on the UI for password setting and the order of selection of the attribute information.

7. The electronic device as claimed in claim 6, wherein each of the plurality of objects included in the UI for password setting includes the predetermined attribute.

8. The electronic device as claimed in claim 6, wherein the processor device is configured to:
    control the display to display a user interface (UI) for selecting an attribute to be used for the password setting from among the plurality of attributes; and
    store the attribute selected on the UI as the predetermined attribute.

9. A method for controlling an electronic device comprising:
    storing a password in a memory, wherein the password corresponds to an order of selection of a predetermined attribute among a plurality of attributes and is set based on selection of a first plurality of objects respectively having the plurality of attributes;

based on an event for unlock occurring, displaying a user interface (UI) including a second plurality of objects that is different from the first plurality of objects, the second plurality of objects respectively having the plurality of attributes and at least one dummy object, wherein the at least one dummy object is not designated to be used when forming the password; and based on at least two objects being selected from among the second plurality of objects included in the UI, performing an unlock operation based on attributes of the selected at least two objects corresponding to the order of selection corresponding to the password.

10. The method as claimed in claim 9, wherein the plurality of attributes include at least one of a shape, a color, and a pattern, and
wherein the password is set based on attribute information based on any one of the shape, the color, and the pattern and an the order of selection of the attribute information.

11. The method as claimed in claim 9, wherein the performing the unlock operation comprises:
based on the at least two objects being selected from among the second plurality of objects included in the UI, performing the unlock operation by comparing orders of selection of attribute information set to have the password from among a plurality of attributes of each of the selected at least two objects.

12. The method as claimed in claim 9, wherein the performing the unlock operation comprises:
generating the second plurality of objects included in the UI by combining a first attribute set to have the password and a second attribute excluding the first attribute from the plurality of attributes.

13. The method as claimed in claim 9, wherein the performing the unlock operation comprises:
displaying a user interface (UI) including an authentication object including first attribute information of the first attribute set to have the password, and a dummy object including second attribute information of the first attribute,
wherein the second attribute information is different from the first attribute information.

14. The method as claimed in claim 9, further comprising:
displaying a user interface (UI) for password setting which includes a plurality of objects respectively having the plurality of attributes; and
storing, as the password, attribute information corresponding to the predetermined attribute from among a plurality of attributes of an object selected on the UI for password setting and the order of selection of the attribute information.

15. The method as claimed in claim 14, wherein each of the plurality of objects included in the UI for password setting includes the predetermined attribute.

16. The method as claimed in claim 14, further comprising:
displaying a user interface (UI) for selecting an attribute to be used for the password setting from among the plurality of attributes; and
storing the attribute selected on the UI as the predetermined attribute.

* * * * *